United States Patent [19]

Kuge et al.

[11] Patent Number: 4,842,944
[45] Date of Patent: * Jun. 27, 1989

[54] ELASTIC ROTATABLE MEMBER

[75] Inventors: Tsukasa Kuge, Tokyo; Masahiro Goto, Kawasaki; Isamu Sakane, Ohtsu, all of Japan

[73] Assignee: Canon Kabushiki Kaisha, Tokyo, Japan

[ * ] Notice: The portion of the term of this patent subsequent to Feb. 14, 2006 has been disclaimed.

[21] Appl. No.: 793,546

[22] Filed: Oct. 31, 1985

[30] Foreign Application Priority Data

| Nov. 7, 1984 | [JP] | Japan | 59-234780 |
| Jan. 24, 1985 | [JP] | Japan | 60-011367 |
| Jan. 24, 1985 | [JP] | Japan | 60-011368 |
| Jan. 24, 1985 | [JP] | Japan | 60-011369 |
| Jan. 28, 1985 | [JP] | Japan | 60-014078 |
| Jan. 28, 1985 | [JP] | Japan | 60-014079 |
| Jan. 29, 1985 | [JP] | Japan | 60-016166 |

[51] Int. Cl.$^4$ .................. B32B 13/12; B32B 27/00; B32B 3/26; G03B 21/00
[52] U.S. Cl. .................. 428/451; 428/219; 428/315.7; 428/315.9; 428/319.3; 428/335; 428/336; 428/421; 428/422; 428/447; 428/448; 428/450; 264/127; 29/132; 355/285; 219/216
[58] Field of Search ............. 219/216; 432/60

[56] References Cited

U.S. PATENT DOCUMENTS

| 2,764,505 | 9/1956 | Kilbourne et al. | |
| 3,304,221 | 2/1967 | Eggleton | 428/451 |
| 3,987,530 | 10/1976 | Atkin et al. | 428/447 |
| 4,082,893 | 4/1978 | Okita | 428/315.5 |

FOREIGN PATENT DOCUMENTS

| 57-89785 | 6/1982 | Japan . | |
| 0089785 | 6/1982 | Japan . | |
| 58-27175 | 2/1983 | Japan . | |
| 59-74578 | 4/1984 | Japan . | |
| 239237 | 11/1985 | Japan | 428/421 |
| 35241 | 2/1986 | Japan | 428/421 |
| 153179 | 7/1986 | Japan | 428/421 |

Primary Examiner—Ellis P. Robinson
Assistant Examiner—Susan S. Rucker
Attorney, Agent, or Firm—Fitzpatrick, Cella, Harper & Scinto

[57] ABSTRACT

An elastic rotatable member, includes an elastic rubber layer, a surface layer of resin formed on the elastic layer, wherein the surface layer is provided by applying resin material together with liquid to a surface of the elastic rubber layer and sintering the resin material by heating the resin material up to a sintering temperature thereof while keeping the elastic rubber layer below its durable temperature, wherein the heating is effected by dielectric heating to heat the resin material up to a higher temperature than that of the rubber layer.

117 Claims, 10 Drawing Sheets

ELASTIC ROTATABLE MEMBER

FIELD OF THE INVENTION AND RELATED ART

The present invention relates to an elastic rotatable member, such as an elastic roller or belt, more particularly to a rotatable elastic member having a backing rubber layer and a surface resin layer thereon. The roller of the present invention is concerned with conveying means for conveying goods or articles; a conveying rotatable member such as a roller or belt usable with office equipment, a roller or belt for feeding paper in a printer or the like, a platen roller for a word processor, or a conveying roller for a duplex (forming images on both sides of paper) recording apparatus; and an image fixing roller or belt such as a heating roller, a pressing roller, heating-pressing roller or the like, for fixing an image or drying paper, usable with an image forming apparatus such as a copying machine, a printer, a facsimile machine or a combination thereof.

Generally, in order to convey or transport a sheet of paper or an article, a roller or belt provided with a rubber surface layer or a resin surface layer is used. With use, however, the surface of such a roller or belt is worn so that the conveying action becomes improper. For example, the diameter of the rubber roller reduces, or the surface hardness changes with long term use, resulting in failure of transportation or of image transfer (platen roller or the like). On the other hand, a resin roller is not easily worn, but it is poor in elasticity, and therefore only a slight amount of wear can result in improper conveyance.

In any case, currently available conveying rotatable members for feeding sheets of paper have not been durable to 200,000 sheets conveyance with desirable performance maintained. It is, therefore, desired to provide a durable and non-adherent roller or belt which has a proper surface hardness and which can be resiliently contacted to the sheet or another article, with high reliability.

In the field of the image fixing, a similar resin roller or rubber roller is used. Additional burdens are imposed on such a roller from the standpoint of heat and pressure. It is popular to use, as a heating roller contactable to a toner image, a roller coated with tetrafluoroethylene resin and to use, as a pressing roller press-contacted to the heating roller to increase the time period of heating and pressing the toner image, a roller coated with a rubber layer. Those rollers form a nip by press contact therebetween. However, since the surface of the heating roller is like a rigid member, it does not sufficiently follow the minute roughness of the sheet surface having the toner image resulting in less effective heat transfer during the heating and pressing operation. Therefore, the quality of the fixed image is poorer than when a rubber roller is used as a heating roller, and curl of the sheet produced is greater. When a rubber roller is used for the heating roller contactable to the toner image, the toner offset increases because of its poor releasability, and it is relatively easily worn by a separation pawl, a sensor or the like contacted thereto, because of its poor resistance to wear, resulting in increasing occurrences of partial non-image fixed parts or partial toner offset.

Under the circumstances, the rubber roller and the resin roller have their own advantages and corresponding disadvantages. Therefore, a roller is desired which has the advantages of both of them.

Japanese Laid-Open Patent Applications Nos. 2864/1983, 5770/1983 and 27175/1983 propose a roller having a metal core coated with a mixture of fluororubber and fluorine resin or a roller having a rubber roller coated with a mixture of fluororubber and fluorine resin.

However, since the mixture is as disclosed in Japanese Laid-Open Patent Application No. 135871/1982, it has not been possible to obtain an image fixing roller contactable to a toner image which is optimum in view of the actual image fixing conditions. While a roller was actually manufactured by us following the disclosure of those publications, a sufficient resin content could not be obtained at the surface of the mixture layer, and the layer was at most 2 microns. In addition, the surface resin layer could not be sufficiently sintered, and therefore the resistance to wear was so poor that it could not perform image fixing operations for as small as several thousands of sheets at high speed image processing. Thus, only a thin mixture layer can be formed on the surface of the fixing roller, and it is known that a rubber layer is required under the mixture layer in order to obtain a desired elasticity, as disclosed in the Japanese Laid-Open Patent Application 5770/1983.

When the mixture layer is formed on a rubber layer of a roller and is directly heated to be sintered for 30 minutes at a high temperature of 400° C., the surface layer of the mixture contains slightly more fluorine resin (approx. 3 microns). However, it has been found that the rubber layer is depolymerized so as to lose elasticity.

Thus, obtaining sufficient elasticity is contradictory to obtaining a larger resin content at the surface of the mixture layer. Therefore, it has been difficult to provide a satisfactorily durable elastic roller which has both characteristics.

An elastic roller for use with image fixing (heating or pressing) requires the resiliency provided by the rubber layer and the increased resin content at the surface of the mixture layer with a view to providing satisfactory image fixing, heating and pressing. Actually, however, it is only a desire to obtain such a roller having sufficient durability and releasability.

Japanese Patent Application Publication No. 20747/1972 has proposed that a rubber roller be simply formed and then wrapped by a resin tube. This is practically used. According to this proposal, the surface of a silicone rubber roller is abraded and ss coated with a bonding agent. Prior to this, a heat-shrinkable tube of fluorinated ethylene propylene (FEP) having a diameter larger than that of the rubber roller is prepared. The tube is telescoped on the rubber roller, and they are heated at a temperature of 104.4° C. for heat-shrink and are further heated at a temperature of 182.2° C. for one hour. However, since the amount of heat shrink is not uniform, it is difficult to provide a roller having a desired shape. Additionally, after the tube is produced, the inner surface must be cleaned to a great extent. At present, the thickness of the heat-shrinkable tube has to be larger than 50 microns, which is large enough to offset the elasticity provided by the rubber layer thereunder to the surface layer. For this reason, it is not possible to provide a roller having sufficient elasticity. The dimensional accuracy of the roller thus produced is poor, and in addition, the manufacturing cost is high because a larger number of steps is required. More importantly, no satisfactory fixing operation can be performed.

Laid-Open Japanese Patent Applications Nos. 89785/1982 and 74578/1984 propose some rollers.

However, these are not practical. In view of the fact that both use a sintering temperature of 300° C. and that the former uses tetrafluoroethylene-hexafluoropropylene copolymer as the fluorine resin, the surface of the resin layer is not sintered sufficiently to provide satisfactory resistance to heat and wear. Therefore, the surface is easily worn, with the result that it can not even fix as few as several thousands of sheets. It is not practically usable as the image fixing roller. The reasons have been found as follows. The liquid fluorine resin is applied to the surface of the silicone rubber roller. If the liquid is of tetrafluoroethylene resin, the sufficient sintering occurs only when it is heated up to the temperature higher than 327° C. (crystalline melting point), preferably, 340°-360° C. If it is tetrafluoroethylene-perfluorovinylether copolymer, it has to be heated up to the temperature of 306° C. (crystalline melting point) or higher, preferably 320°-340° C. in order to sufficiently sinter it. When the temperature is as low as 300° C., the fluorine resin does not melt, but remains dry and powdery, and no film is formed, with the result that the resin properties can not be obtained. With the low temperature sintering at 300° C. or lower (lower than crystalline melting point), the resin properties can not be provided, and in addition, the bonding between the rubber layer and the resin surface layer is poor. In fact, the resin has such a poor strength that it is easily separated or peeled. If the bonding is not good enough between the rubber layer and the resin surface layer, the local stress which can be produced when the rollers grip a sheet therebetween causes a slip between the layers, by which the surface resin layer is easily separated, or the surface resin layer is torn by a separation pawl or the like. Particularly since the low temperature sintering at 300° C. does not provide the durability to wear and sufficient strength of resin, it is durable only to 20,000-30,000 sheets because of toner offset even without paper jamming; and therefore, it is difficult to use it for practical purposes. As described, the elastic rotatable member of the prior art is less durable and not practical.

In the field of an article conveyance, many requirements are imposed on the rotatable member, such as elasticity to ensure conveyance, releasability required for the purpose of increasing durability and preventing contamination, and prevention of electrification. However, a rotatable member which satisfies those requirements is complicated and costly. It is conventional that a large quantity of material exhibiting low electric resistance and high heat conductivity are contained in the resin so as to prevent the electrification or charging of the surface of the resin layer. This increases the manufacturing cost because the large amount of electrically conductive material must be uniformly dispersed. In addition, the conductive materials generally exhibit poorer surface releasability than the resin, and therefore, the addition of the conductive material results in increasing toner offset.

When the above-described roller is used as a heating roller, the backing rubber layer is heated internally or externally, by which a loss in weight can take place due to emitted gases. The gas emission occurs particularly when the resin layer is sintered. This deteriorates the bonding between the resin layer and the rubber layer, thus significantly degrading the durability.

In a fixing device, it is usual that offset preventing liquid is applied to the surface of the roller. If the backing layer is swollen by the liquid, the resin layer may be peeled off the backing layer, with the result that the durability and the fixing power are deteriorated.

SUMMARY OF THE INVENTION

Accordingly, it is a principal object of the present invention to provide an elastic rotatable member wherein durability is improved by elasticity, non-adhesiveness of the surface, and the surface hardness, whereby an article or the like can be stably conveyed.

It is another object of the present invention to provide an elastic rotatable member which has sufficient resin properties without deteriorating the rubber properties through a novel manufacturing process.

It is a further object of the present invention to provide an elastic rotatable member usable for fixing an image, which has resin properties on its surface, and proper elasticity as a whole, whereby the fixing action, the resistance to wear and releasability are improved.

It is a further object of the present invention to provide an elastic rotatable member usable for fixing an image, wherein toner offset is decreased, image quality or sharpness is improved, curl of recording material is prevented, and the recording material is passed in good order.

It is a further object of the present invention to provide an elastic rotatable member usable for general purposes which has a charging prevention effect wherein the surface releasability and the durability are improved.

It is further object of the present invention to provide an elastic rotatable member usable for fixing an image, which has proper elasticity, wherein the fixing action, the resistance to wear, the service life and offset prevention are improved.

It is a further object of the present invention to provide a rotatable member usable for general purposes, comprising a rubber layer and a surface resin layer, wherein the electric charging is decreased; the bonding between the rubber layer and the surface resin layer is stabilized; and the durability is improved, or to provide a device comprising such a rotatable member.

It is a further object of the present invention to provide an elastic rotatable member usable for fixing an image, comprising a rubber layer and a surface resin layer, wherein the thickness of the resin layer and the impact resilience of the rubber layer are so related that the fixing action, the durability to wear and the service life are improved.

It is a further object of the present invention to provide an elastic rotatable member usable for fixing an image, comprising a rubber layer and a surface resin layer, which is usable together with another rotatable member to form a nip therebetween, wherein the nip is so determined that fixability and durability are improved.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
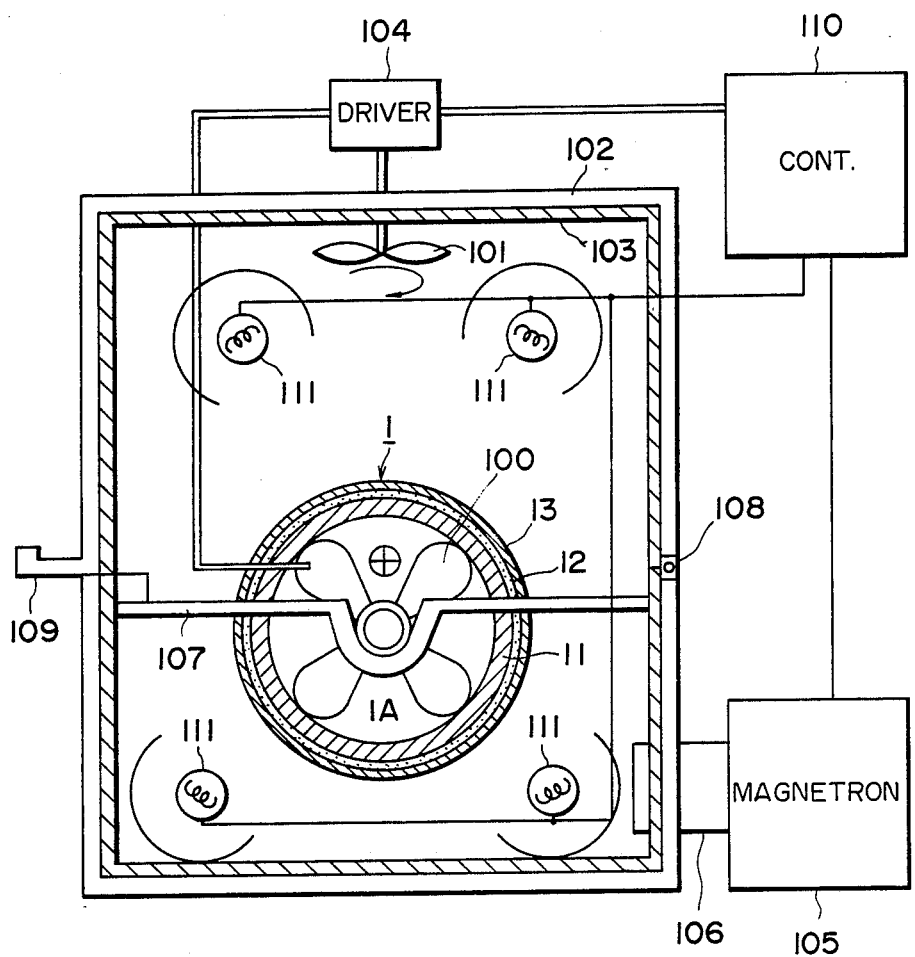
FIG. 1 is a sectional view of an apparatus for manufacturing an elastic rotatable member according to the present invention.
Figure 2:
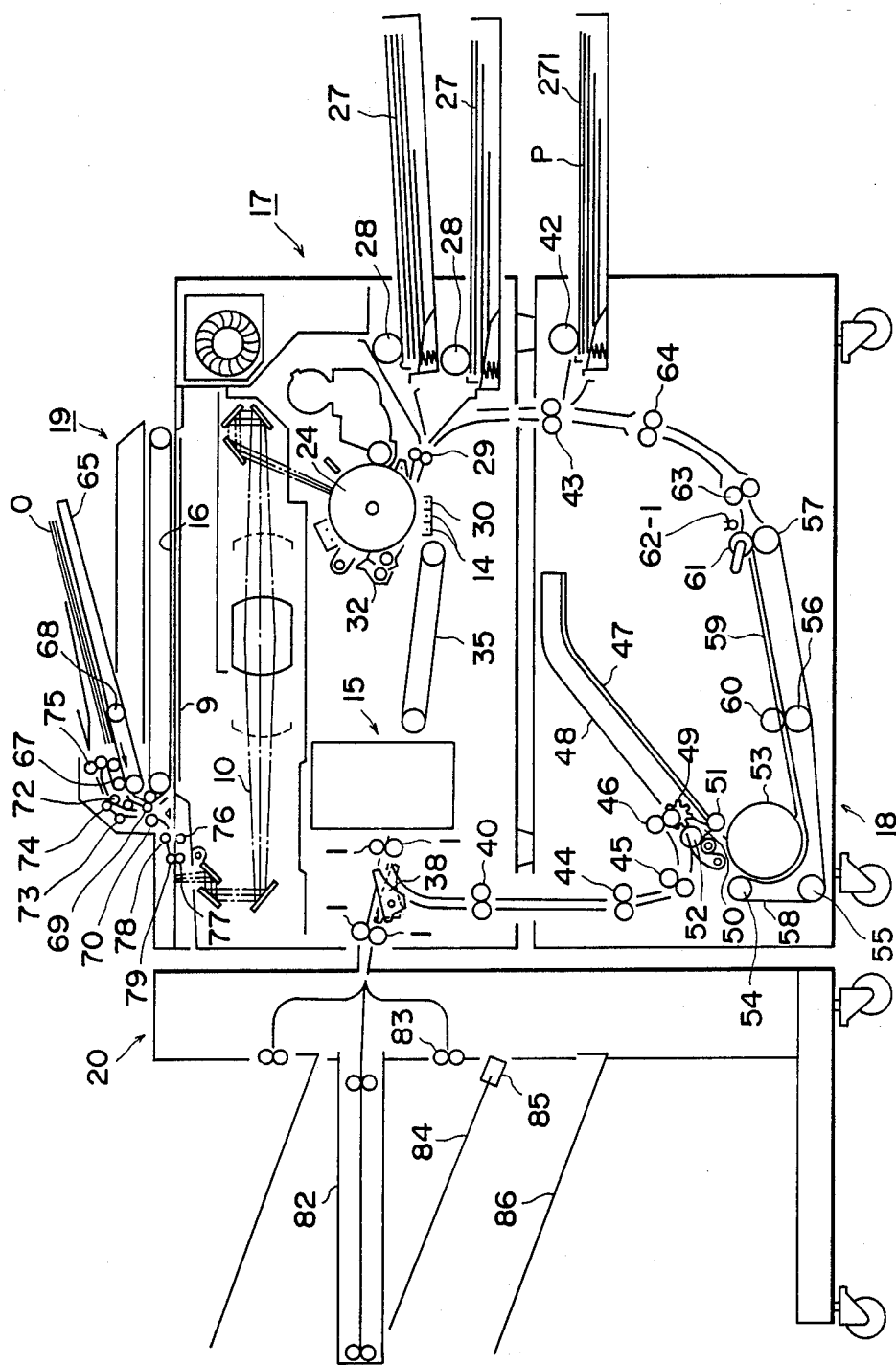
FIG. 2 is a sectional view of an electrophotographic copying apparatus having various parts on which the elastic rotatable member of the present invention is usable.
Figure 3:
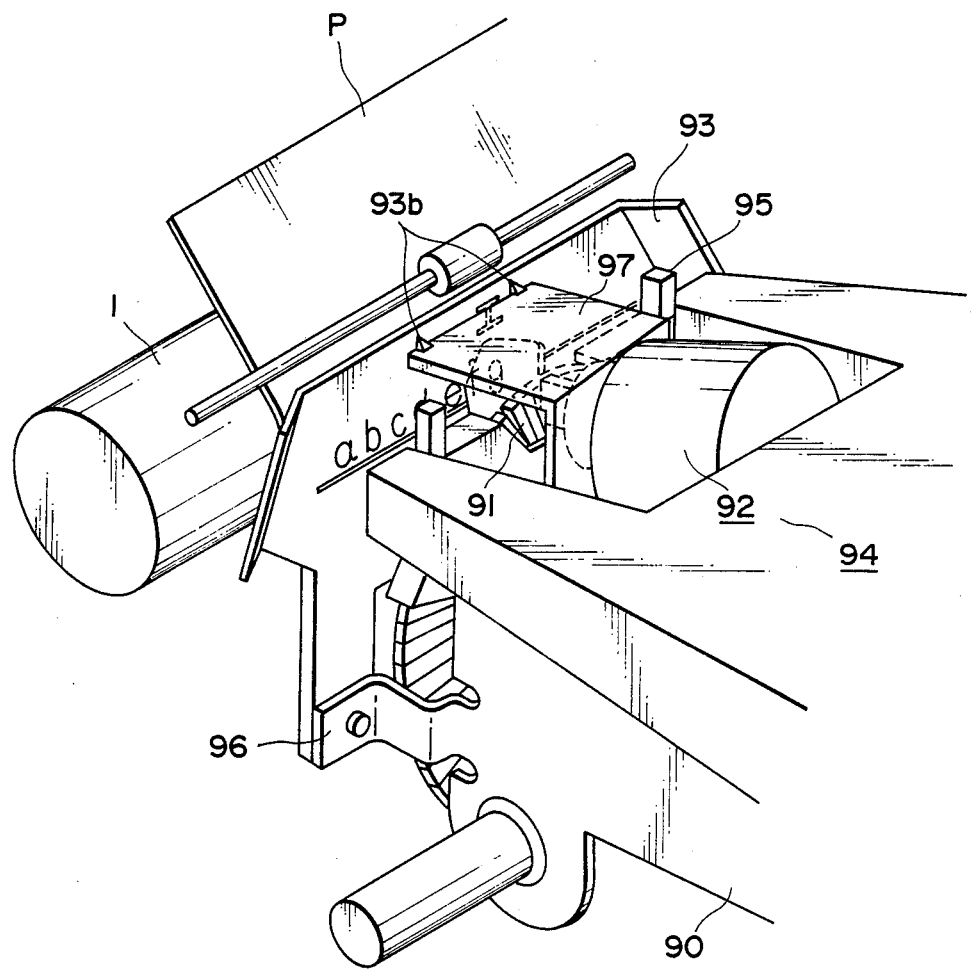
FIG. 3 is a perspective view of an impact printer to which an elastic rotatable member of the present invention is applicable.
Figure 4:
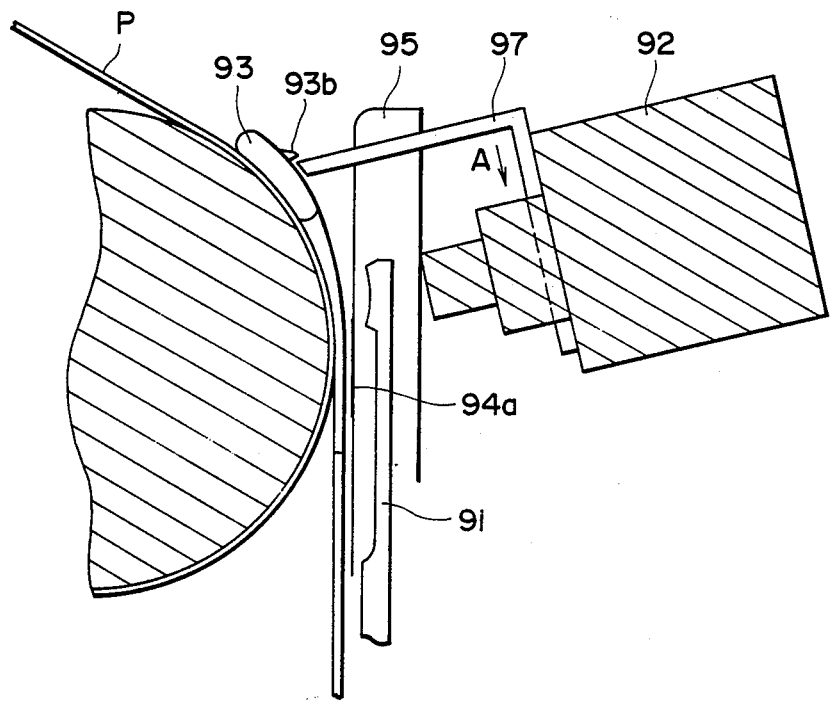
FIG. 4 is a sectional view of a printer of FIG. 3.

FIG. 1 shows an example of an apparatus for manufacturing an elastic rotatable member according to the present invention. This apparatus is usable to manufacture the elastic rotatable member used in the devices of FIGS. 2-12, which will be described hereinafter. Of these Figures, FIGS. 2-4 are concerned with ordinary conveying devices wherein heat is not used, and pressure is fairly low as compared with the case of image fixing.

First, the process of manufacturing an elastic rotatable member according to the present invention will be described. A vulcanized and molded rubber layer is formed on a core metal into a desired shape. Onto the surface of the rubber layer, resin powder (not sintered), in the form of a dispersion (the resin powder is dispersed in water with surface-active agent), enamel, powder or the like is applied over the entire length of the rubber roller uniformly by spray, electrostatic deposition, powder coating or the like. Then, the resin coating is heated up to a high temperature which is higher than a crystalline melting point of the resin, while keeping the rubber roller below such a temperature so that the rubber does not smoke or depolymerize. More particularly, the surface resin is quickly heated, while quickly cooling the rubber layer from the inside of the core metal. In the apparatus of FIG. 1, a dielectric heating method is used which utilizes the fact that the dielectric loss tangent of the liquid resin (dispersion or enamel) is larger than that of the rubber layer. Although this method is preferable, the present invention is not limited to this method of manufacturing.

According to this method, a temperature gradient is formed across the thickness of the rubber layer, but the temperature of the rubber can be maintained below a temperature (for example, not less than 200° C.) which is lower than the heat-durability temperature of the rubber, while the unsintered resin is heated to a temperature above the crystalline melting point thereof (for example, not less than 250° C.) for 5–10 minutes. After the sintering, the roller is cooled quickly. By this, a sintered surface resin layer having sufficient resin properties with low degree of crystallinity is formed on the rubber layer with a strong bonding thereto, the sintered resin layer having a desired thickness.

Therefore, the rubber layer has rubber properties which are equivalent to those prior to the sintering of the resin layer, while on the other hand, the surface resin layer is completely sintered and exhibits resin properties, and simultaneously, the bonding strength between the layers is very high.

In order to measure the elongation and the tensile strength of the resin layer, the resin film only is peeled from the manufactured roller in a size of 15 mm (width)×100 mm (length) as a test piece. The test piece is tensioned by chucks spaced by 20 mm at a stress rate of 250 mm/min. It has been confirmed that the test piece has the same properties as those of a resin member which are sintered alone.

In order to measure peel strength, the surface of the manufactured roll is cut by a knife in a circumferential direction in two lines spaced by 10 mm, and it is partly peeled. The peeled part is pulled by a tension meter. The maximum reading of the tension meter is taken as the peel strength of the resin layer. It has been confirmed that when fluorine resin is used, the peel strength is not less than 20 g/10 mm (width).

FIG. 1 is a sectional view of an apparatus by which an elastic rotatable member according to this invention can be manufactured, wherein both a dielectric heating device and an infrared external heating device are used in combination. The apparatus comprises a magnetron 105 for producing high frequency (950–2450 MHz), a waveguide 106 for transmitting the high frequency produced by the magnetron 105, an openable resin container 102 having an inside liner plate 103 of a metal for reflecting the high frequency, the container 102 being connected with the waveguide 106. The apparatus further includes in the container 102 infrared lamp 111 for additionally heating the roller from the outside thereof, and includes a shade.

Within the resin container 102, there are fan 100 for producing air flow in the central space of the hollow roller, and fan 101 for producing air flow in he container 102, which are driven by external driving devices, respectively. The container 102 is openable about a pivot 108, wherein the upper part has a grip 109 fixed thereto, and the lower part has an arm 107 fixed thereto for positioning a flange 1A of the roller 1.

The apparatus includes a control device 110 which serves to control the driving device 104, the magnetron 105 and the infrared lamp 111 in response to the opening or closing of the container on the basis of a predetermined starting signal with a variable timer, not shown.

Since the roller 1 has a surface resin dispersion and a backing rubber layer, the energy from the high frequency is absorbed more by the dispersion, which has a relatively higher dielectric constant than the rubber layer. The resin dispersion is quickly heated by the high frequency and the infrared lamp in the thermostatic chamber to a temperature above its sintering temperature. At this time, the rubber layer absorbs less energy from the high frequency with the result that it is not heated as much as the dispersion, and it is maintained relatively cool. Because of this, the above-described roller properties or characteristics can be provided.

An embodiment of the present invention includes an elastic rotatable member having the rubber layer thickness of 0.1-10 mm and the resin layer thickness of 1-50 microns. Those thicknesses may be averages of the respective layers, and preferably they are minimum thicknesses.

Ordinarily there is no bonding layer between the resin layer and the rubber layer in the manufacturing methods described above. However, the present invention includes an elastic rotatable member with such a bonding layer.

The resin layer preferably contains material of high dielectric constant, and more specifically, it may be of silicone, polyimide, polyamide, polyamideimide or the like.

As for the rubber layer, it is of rubber material having a heat durable temperature which is lower than the melting point of the resin material, more specifically, it may be of ethylenepropylene rubber or the same rubber mixed with another rubber.

FIG. 2 is a duplex recording apparatus to various parts of which the present invention is applicable.

The apparatus includes an image forming station where an image is formed on paper through an electrophotographic copying process. Since such a process is known, the detailed description of the process will be omitted. In this apparatus, an ordinary recording material (paper) is used as a transfer material onto which an image is transferred. The apparatus comprises a copying station 17, a duplex handling station 18, an automatic original handling station (Recirculation Type Document Feeder) 19 and a sorter/stapler station 20. In the copying station 17, a known image forming process is executed. More particularly, an original on glass 9 is optically scanned by a movable optical system 10, and the reflected light is projected onto a surface of a photosensitive member 24 to form an electrostatic latent image theron. The electrostatic latent image is visualized by a developing device into a toner image. A sheet of paper onto which the visualized toner image is to be transferred, is supplied from a paper feeding station 27 by a pickup roller 28 from the feeding station 27, is once stopped by registration rollers 29, and then is fed to the photosensitive member 24 thereby in alignment with the toner image thereon. Subsequently, the toner image on the surface of the photosensitive member 24 is transferred onto the transfer sheet by a transfer charger 30. The sheet is then separated from the photosensitive member 24 by a separation charger 14 and is conveyed to a fixing device 15 on a belt 35. Around the photosensitive member 24, other necessary known means are provided, such as cleaner means 32 or the like. The transfer sheet on which the toner image has been fixed by the fixing device 15 is guided by a guide 38 to a sorter/stapler 20 in a simplex copy mode in which the guide 38 takes the position shown by broken lines in the Figure. When the duplex copy mode is selected, the simplex copy sheet is transported to the duplex handling station 18 by the guide 38 which now takes the solid line position.

The duplex handing position 18 serves to receive the simplex copy and re-feed the sheet for the purpose of image formation on the other side of the sheet. In this embodiment, the duplex handling station 18 is provided with an auxiliary feeding tray 271. When this tray is selected by the copying station 17, the sheet P is fed from the auxiliary feeding tray 271 by a pick up roller 42 so that the sheet P can be transported to the transfer station of the copying station 17. The sheet received by the duplex handling station 18 by the switching guide 38 and a pair of rollers 40, is discharged onto a tray 47 upwardly inclined toward righthand in the Figure by pairs of rollers 44, 45 and 46. At this time, the possible lateral deviation of the sheet is corrected by the guiding side wall 48. Then, the trailing edge of the sheet is urged downwardly and it is pulled inclinedly and downwardly (lefthand side) by a rotatable member 49 having a projection on its outer periphery. At this time, a stopping member 50 is effective to confine the leading edges of the sheets and to allow passage of only one sheet. In cooperation with the stopping member, the rollers 51 and 52 feed the sheet from the tray 47 continuously with proper intervals. The sheet fed out thereof is turned by a roller 53 and a belt 58 contacted to the outer surface of the roller 53 and operatively disposed around rollers 54, 55, 56 and 57. With this operation, the face of the sheet is inverted. Above the belt 58 a guide 59 is disposed, and rollers 56 and 60 support therebetween the belt 58, so that the transportation of the sheet on the belt 58 is ensured. Adjacent the roller 57, a roller 61 for refeeding the sheet is provided which is cooperative with a sheet sensor 62-1 and a pair of feeding rollers 63 to feed rightwardly one by one the sheets fed by the belt 58. The sheet is then transported through a pair of rollers 64 and a pair of rollers 43 to the registration roller 29. The sheet is fed to the transfer station so as to be aligned with the second image formed on the photosensitive member 24. At the transfer station, the fresh side of the sheet receives the second image. After the image transfer, the sheet is separated and conveyed to the fixing device 15 where the image is fixed thereon. The sheet is conveyed to the switching guide 38, which at this time takes the position shown by dotted lines, so that the sheet is discharged out of the apparatus. The duplex handling station 18 repeats the operation to enable one to take duplex copies.

The automatic document reciculation feeder 19 separates and feeds original documents one by one from the bottom of the stack of original documents 0 by the oppositely rotating belts 68 and 67, the original documents 0 being stacked on an original stacking tray 65. The original 0 is turned so as to face down and is introduced onto the surface of the glass 9 by the belt 16 to a predetermined position thereon. The image bearing surface of the original 0 is scanned by an optical system 10, and is copied on the sheet in the manner described above. The original 0 which has been scanned is fed back through the nip between a roller 69 and a roller 70 by a reversed rotation of the belt 16. Then, the original is discharged onto the topmost of the stacked originals on the stacking tray 65 by a pair of rollers 75. By repeating the operation, the original documents are copied sequentially.

When the original document is a duplex document, the recirculation type document feeder can supply each side of the originals to the original glass by the operations of the belt 16 and rollers 72, 73, 74, 76, 77, 78 and 79. Since the operations necessary for this is not directly concerned with the essential concept of the present invention, a detailed explanation thereof is omitted.

The automatic sorter/stapler station 20 functions to bind the copy sheets discharged from the copying station 17. The stapler station 20 comprises a tray for stacking the sheets and a passage 82 communicating with another sheet handling device, for example, a sorter. When the stapling mode is selected, the passage is switched to be led to the pair of rollers 83 so that the sheets are stacked on the tray 84. When a predetermined number of sheets are stacked on the tray 84, the stapler station 20 operates to effect the binding operation. The sheets, after being bound, are stacked on the stacking tray 86. Thereafter, it is possible to receive the next sheet to be bound.

The apparatus of FIG. 2 contains a number of rotatable members, which may be categorized into sheet feeding rotatable members (prior to image formation), sheet transporting rotatable members (after the image formation) and original feeding rotatable members. All of the rotatable members, except for the registration rollers 29 and belts are shorter than the width of the sheet, and therefore, a plurality of such rollers with proper intervals for feeding the sheets are used with proper intervals. However, even with such proper intervals, when one of the rollers which form a set cooperating to perform a single function becomes worn or contaminated, the sheet is obliquely advanced, or the sheet is not properly fed. Accordingly, the rollers preferably have a high resistance to wear and have proper elasticity. For this reason, it is preferable to use elastic rollers described hereinbefore. Particularly, the sheet feeding rotatable members 28, 42, 67 and 68 are press contacted to the surface of the sheet resulting in increased surface wear. When the above described elastic rotatable member is used, which is good in resistance to wear and elasticity, good feeding can be maintained for a long period of time. On the other hand, the sheet transporting rotatable members 1, 40, 44–46, 49, 51, 52, 53, 58–61, 63, 64, 80 and 83 which are operative after the image formation, are easily contaminated by the fixed image or paper dust. When the present invention is used, this can be prevented with a stabilized sheet transportation. The original handling rotatable members 16 and 69–79 are contaminated by the contamination of the original, which might result in failure of transportation. This problem can also be solved by employing the elastic rotatable member of the present invention.

The roller 35 between the fixing device and the image transfer station where the powder image is formed on the transfer sheet tends inconveniently to make trouble because of the scattering of the toner powder and other foreign matter. Those can be avoided by employing the elastic roller according to this invention. It is possible that the registration roller 29 can fail. This can also be prevented by using the elastic rotatable member so as to stably transport the sheet.

As described, the present invention is applicable to any part of sheet advancing mechanism, more particularly to various portions 18, 19 and 20 of the apparatus described above.

FIGS. 3 and 4 illustrate a printing device to which a roller of the present invention is applicable. In a usual printer which is used with a typewriter, for example, a paper holder is provided between the ink ribbon and the paper P to printed. The paper holder functions to prevent ink ribbon from contacting the paper while not printing, and in addition to guide the paper to be disposed on the surface of the platen. Further, it can function to prevent the paper from departing from the surface of the platen (which will lower the printing noise).

In this case, the above-described elastic rotatable member 1 is used for the platen roller. The ribbon 94a (FIG. 4) supplied from a ribbon cassette 94 is in the position lower than the printing position, in FIG. 3. This position is required for the operator to read the printed character through the paper holder, and therefore, the ribbon is lower than the printing position. Upon the printing action, the ribbon is shifted up by about 6 mm. The printer cbmprises a carriage 90 slidable along the platen roller 1, which carries a daisy wheel 91, a hammer 92, a paper holder 93 attached at plate 93 and a ribbon cassette 94.

A ribbon guide 95 is provided at both sides of the daisy wheel in order to prevent contact between the ribbon and the daisy wheel.

When printing is to be effected on standard paper, the paper holder 93 takes the position indicated by the solid lines, the ribbon 94a travels in the longitudinal direction in the space between the paper holder 93 and the ribbon guide 95, and it shifts in the perpendicular direction.

When the paper holder 93 is bent so that it contacts to the ribbon, the operator can detachably mount a reinforcing member 97 to the hammer 92. In this example, it is mounted to the hammer 92. It may be mounted to a motor for the daisy wheel 91, not shown, or to a ribbon guide 95. In this case, the paper holder has a pawl 93b so as to prevent the reinforcing member 97 from being removed by vibration.

The reinforcing member 97 is effective to limit the upper part where the deviation is large when the paper holder is bent.

FIG. 4 is a sectional view of a printer shown in FIG. 3, which illustrates that the reinforcing member 97 is easily mounted to the hammer 92 by an operator in the direction of an arrow A.

The platen roller 1 is effective to receive the pressure from the hammer 92 and to stop and feed the printing paper P. To perform this function, the roller 1 is required to exhibit durability and elasticity of the surface. The roller according to this invention can satisfactorily meet the requirements. The surface exhibits the resin properties, the rubber elasticity is not deteriorated, and the surface layer may be made thin.

The rotatable member is particularly effective in the case of office equipment, and also to other paper feeding mechanisms.

Referring back to the method of producing the roller according to this embodiment, the infrared lamp for the external heating is not absolutely required but can be used if desired. Generally, however, it is preferable to use the lamp since it can increase the absorption of the high frequency by the liquid resin by externally heating it.

It is a common advantage of the roller according to this embodiment that the resistance to wear is high, that the releasability is high at the surface thereof, that the surface properties of the surface layer and the elastic properties can be maintained, and that the service life thereof is longer with its advantages.

The rotatable member according to this embodiment has a fairly smooth surface, and therefore, the necessity of abrasion can be reduced.

Briefly, according to this invention, the silicone rubber layer is heated up to not higher than 300° C., while the fluorine resin layer is heated up to the crystalline melting point or higher, which is 327° C. or higher, more preferably, 340°–360° C., when the fluorine resin layer is of tetrafluoroethylene resin (hereinafter will be called "PTFE"); and which is 306° C. or higher, more preferably, 320°–340° C., when the fluorine resin liquid is of tetrafluoroethylene-perfluorovinylether copolymer (hereinafter willbe called "PFA").

Because of this, the fluorine resinis satisfactorily sintered, and the sintered resin shows the degree of crystallinity of not more than 95% and the tensile strength of not less than 50 kg/cm² and shows satisfactory resin properties. On the other hand, the silicone rubber has a satisfactory rubber elasticity having a room temperature JIS (Japanase Industrial Standard) A hardness of 30–80 degrees.

Because of this feature, the elastic rotatable member provides good fixing properties, and the durability thereof is such that it can be used for copying 200,000–300,000 sheets in usual fixing operation; also, various problems in the image fixing can be solved.

Figure 5:
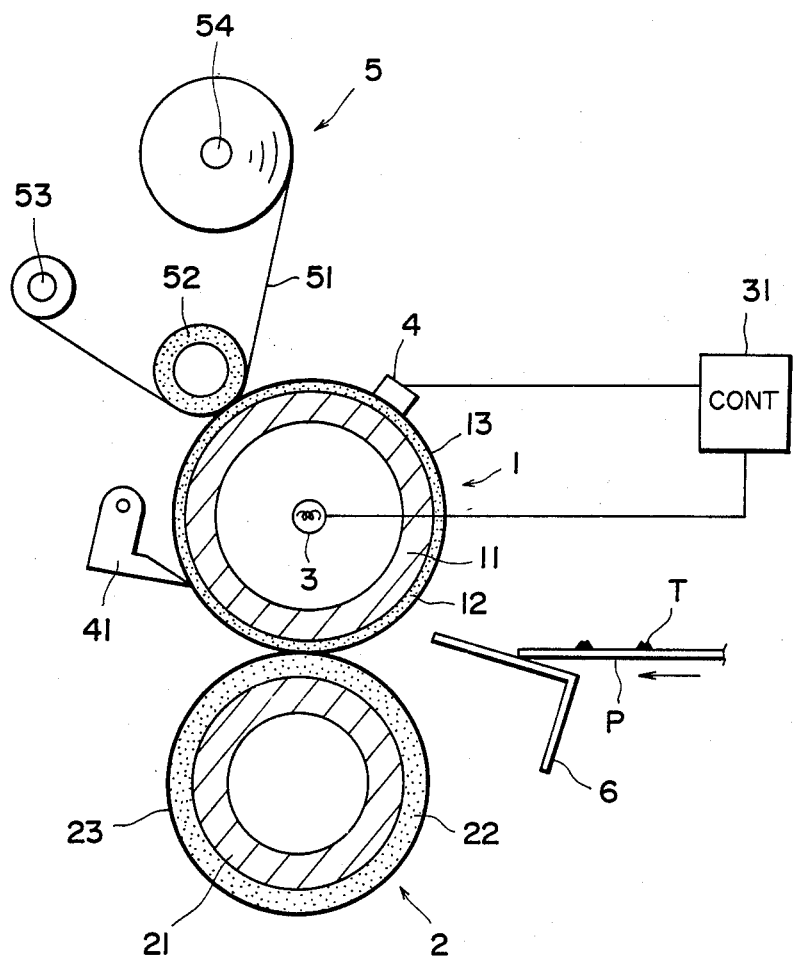
FIG. 5 is a sectional view of an image fixing device to which an elastic rotatable member according to the present invention is applicable.

FIG. 5 illustrates an image fixing device according to an embodiment of the present invention.

The fixing device includes a fixing roller 1 contactable to an fixed toner image, and a pressing roller 2 press contacted to the fixing roller 1 for rotation therewith. The elastic rotatable member described above is used for each of those rollers 1 and 2.

The fixing roller 1 has a core metal 11 of good thermal conductivity, such as aluminum, an elastic layer of silicone rubber 12 having a relatively small thickness, for example, 0.3–0.8 mm in this embodiment, and a surface layer 13 of fluorine resin such as PFA and PTFE having a thickness less than that of the elastic layer, for example, 10–30 microns in this embodiment. The pressing roller 2 has a metal core 21 of stainless steel or iron, an elastic layer 22 of a relatively large thickness which is larger than that of the silicone rubber elastic layer 12, for example, 4–10 mm in this embodiment, and a surface resin layer 23 of a fluorine resin such as PFA and PTFE having a thickness smaller than that of the elastic layer 22, for example, 5–50 microns in this embodiment.

Those rollers may be produced in the manner described in conjunction with FIG. 1. More particularly, a rubber layer (thermal conductivity of $1.4 \times 10^{-4} - 1.5 \times 10^{-3}$) is vulcanized and molded on a metal core to form a silicone rubber roller in a desired shape. In this case, the desired shape is reversely crowned, that is, the central portion of the roller has a diameter slightly smaller than that of the end portions. To the surface of the rubber roller, the dispersion of fluorine resin powder in water with a surface-active agent is applied over the entire length of the roller into a uniform thickness. Thereafter, it is heated in the apparatus shown in FIG. 1. A thermal gradient is formed across the thickness of the silicone rubber, but it is heated only to about 260°–280° C., while the fluorine resin is heated up to a sintering temperature of 340°–380° C. which is higher than the crystalline melting point (327° C. in the case of PTFE) for 5–10 minutes. After the sintering, the roller is quickly cooled. By those steps on the silicone rubber roller, a sintered fluorine resin layer is formed having resin properties including crystallinity of not more than 95%, tensile strength of not less than 50 kg/cm², and contact angle (water) of not less than 100 degrees. The resin layer is sufficiently thick and sufficiently strongly bonded to the rubber roller.

Therefore, the silicone rubber of the fixing roller 1 and the pressing roller 2 shows the desirable rubber properties which are substantially equivalent to those before the formation of the surface resin layer (sintered), while on the other hand, the surface fluorine resin layer shows the resin properties which are the same as those completely sintered alone. Additionally, the bonding is strong therebetween. The parameters are described with the conditions preferable to the present invention.

Silicone rubber (12 and 22) has:
  Rubber hardness (JISA): not less than 30 degrees and not more than 80 degrees
  Impact resilience: 65–85%
  100% tensile stress: not less than 10 kg/cm²
  Elongation: not less than 150%
  Coefficient of oxidative deterioration: not more than 2.

Fluorine resin layer (13 and 23) has:
  Thickness of the resin film not less than 5 microns and not more than 30 microns
  Contact angle: not less than 100 degrees
  Elongation: not less than 50%
  Tensile strength: not less than 50 kg/cm²
  Degree of crystallinity: not more than 95%.

The bonding strength between the silicone rubber and the fluorine resin is 20–120 g/10 mm (width) without primer.

Of these parameters, the method of determining the impact resilience, the contact angle, the elongation of the fluorine resin layer, the tensile strength, the degree of crystallinity and the bonding strength will be described. The impact resilience, the tensile stress and the elongation of the rubber are determined on the basis of the method defined in JIS (Japanese Industrial Standard) K6301.

More particularly, the test piece is in the form of a dumbbell having the size of 5 mm (width) × 20 mm (length) × 3 mm (thickness). The silicone rubber only is taken out of the roller member comprising the silicone rubber layer and the fluorine resin surface layer. That is, a roller is produced by forming a fluorine resin layer sintered on a silicone rubber layer by heating the fluorine resin layer up to a temperature of 327° C. or higher, while maintaining the silicone rubber at a temperature below 300° C., so as to provide the resin coating having the properties of a contact angle not less than 100 degree, elongation of not less than 50% and tensile strength of not less than 50 kg/cm². Then, the surface flourine resin layer is taken out, and subsequently the tensile stress and the elongation are measured in accordance with JIS K6301.

As regards the impact resilience, a silicone rubber test piece having the dimension of 12.7±0.13 mm (thickness) × 29.0 mm.(diameter) is produced, which is then heated in the manner described above. After that, the silicone rubber only is taken out, and then the measurement is carried out on the basis of JIS K6301.

As for the silicone rubber of the fixing roller according to this embodiment of the present invention, a piece of silicone rubber with the sintered coating of fluorine resin having the dimensions of 5 mm (width) × 20 mm (length) × 0.3–0.5 mm (thickness) is removed from the core metal thereof, and then the fluorine resin layer is peeled off the silicone rubber. Then, the tensile strength and the elongation are measured in accordance with JIS K6301.

It is desirable that the thickness of the silicone rubber layer is uniform. However, it is difficult to produce such a sample, and therefore, actually it is difficult to make it uniform. The measurements are adopted as approximately 70–80% of the measured values of the test piece described above.

The impact resilience (65-85%) is representative of the ability to follow, with resilience, the minute surface roughness of the paper and the projections created by the existence of the toner during the short period of image fixing operation. When the fixing roller surface follows them sufficiently, it is possible to apply heat and pressure to the toner effectively. According to the inventors' experiments, when a surface fluorine resin layer of 5-30 microns thickness was used, satisfactory image fixing could be performed if the impact resilience of the backing silicone rubber layer is 65-85%. The tensile stress and the elongation of the rubber represent the fundamental property of the rubber concerned with the durability and the fixing property of the fixing roller. The fixing roller using the silicone rubber having 100% tensile stress of 10 kg/cm$^2$ and an elongation of 150% provided a durability of approx. 200,000 sheets with satisfactory fixing properties due to the sufficient impact resilience. With 100% tensile stress of 20kg/cm$^2$ and an elongation of 300% of the silicone rubber, the durability was not less than 300,000 sheets with good fixing properties.

On the other hand, with 100% tensile stress of 7 kg/cm$^2$ and an elongation of 200%, the roller was durable to 150,000 sheets without jam, but by 10 jammings thereafter, the rubber was broken by the pawl. With 100% tensile stress of 15 kg/cm$^2$ and an elongation of 80%, the roller was durable to 100,000 sheets, but by 5 jammings thereafter, the rubber was broken. Those rubbers are not covered by the present invention. The impact resilience thereof was 40-60%, and the fixing properties were rather poor.

Next, a description will be made as to the surface resin layer after the production of the roller.

The degree of crystallinity of the resin was measured by infrared absorption spectroscopy, but it might be measured by X rays or gravity. The contact angle was measured by a droplet shape method (the Japanese Journal "Metal Surface Technique" 17, No. 7, 1966). In the actual measurement of the contact angle with respect to water, the front side contact angle and the rear side contact angle may be different from each other (for example, 118 degrees and 91 degrees). Satisfactory results could be obtained if one of them or the average of them was not less than 100 degrees.

For the purpose of determining the elongation and the tensile strength of the resin layer, the resin film is peeled off the roller after being manufactured. The dimension is 15 mm (width)×100 mm (length) as a test piece. The test piece is pulled between chucks spaced apart by 20 mm at the pulling rate of 250 mm/min. The averages are taken as data. For example, a test piece having a tensile strength of 95 kg/cm$^2$ and an elongation of 80% may mean that the minimums are 72 kg/cm$^2$ and 60%, and the maximums are 180 kg/cm$^2$ and 120%.

As for the peel strength of the resin, the roll surface is cut circumferentially in two lines spaced apart by 10 mm by a knife, a partly peeled part of the fluorine resin layer is pulled by a tension meter, and the maximum measurement is taken as the peel strength.

Referring back to FIG. 5, the other structures of the fixing device will be explained.

The fixing device comprises a heater 3, such as a halogen lamp or the like, for heating the fixing roller internally. The surface temperature of the fixing roller 1 is controlled by the heater 3, a temperature sensor 4 and a control system 31 to be an optimum temperature at all times, which is proper to fuse the toner, more particularly, 160°-200° C. The fixing device further comprises an off-set preventing liquid applying device which also functions as a cleaning device, for applying an off-set preventing liquid such as a silicone oil to the surface of the fixing roller 1. The applying means 5 may include a felt-like member, but a web is used in this embodiment. The web 51 containing the offset preventing liquid is contacted to the fixing roller 1 by an elastic urging roller 52 such as a silicone sponge or the like so that a small amount of offset preventing liquid is applied to the surface of the fixing roller 1. The web 51 is taken up by the take-up roller 53 from the supply roller 54 so that the part of the web contacted to the fixing roller 1 sequentially changes by an unshown control device.

In operation, the recording sheet P bearing the unfixed toner image T is guided by an inlet guide 6 and is received by the nip formed between the rollers 1 and 2. The toner image T is fixed on the recording sheet P into a permanent image by being passed through the nip. The separation pawl 41 contacted to the surface of the roller 1 serves to separate the recording sheet P from the surface of the roller 1 after the fixing operation.

The rollers 1 and 2 for fixing the image according to this embodiment of the present invention involve novel features. For example, since the silicone rubber characteristics are not deteriorated by heat, while on the other hand, the fluorine resin is completely sintered, it exhibits a sufficient impact resilience; the permanent compression strain of the silicone rubber is small; the releasability of the surface thereof is good; the resistance to wear is high; and the elasticity is sufficiently high. Additionally, even if the stress resulting when the toner image is fixed to the recording sheet is localized at the interface portion between the silicone rubber layer and the fluoride resin layer, those layer are not rapidly separated because the strength of the fluorine layer is high, and in addition, the bonding therebetween is strong. Thus, the durability is remarkably improved.

The data of actually embodied structures will be described. As for the fixing roller 1, a roller of 0.5 mm thickness silicone rubber coated with 25 microns PTFE resin layer was used which had the outside diameter in the central portion thereof of 39.8 mm and at the end portions, 39.8 mm+100 microns (the roller is reversely crowned by 100 microns).

The core metal was in the form of a reversely crowned and had the central diameter of 38.75 mm. The material of the core was aluminum. The surface thereof was treated by sand blasting, and then degreased and dried. A silicone rubber sheet was wrapped therearound through a primer. Then, it was press vulcanized at the temperature of 150° C. for 40 min., and subsequently, it was subjected to a secondary vulcanization at a temperature of 200° C. for two hours. Consequently, the rubber layer was machined into a thickness of 0.5 mm. The rubber layer was coated with a fluorine resin dispersion of 25 microns thickness by spray. The rubber was heated at a temperature of 260°-280° C., while the fluorine resin was heated at a temperature of 350° C. for 10 minutes by dielectric heating with the aid of an external infrared lamp.

As for the pressing roller 2, a roller was used which had a silicone rubber layer of 6 mm thickness and PFA resin layer of 20 microns thickness covering the rubber layer and which had the outside diameter of 39.9 mm.

The roller was manufactured in the following manner. The core metal was an iron tube having the outside diameter of 27.86 mm. The surface thereof was sandblasted, degreased and dried. A silicone rubber sheet was wrapped therearound through a primer. It was press-vulcanized at a temperature of 170° C. for 30 minutes, and it was subjected to a secondary vulcanization at a temperature of 200° C. for one hour.

Subsequently, the rubber was machined into a thickness of 6 mm. The rubber roller was coated with PFA resin powder of a thickness of 20 microns. Similarly to the fixing roller, it was sintered for 10 minutes into a pressing roller having the outside diameter of 39.9 mm.

With a fixing device using those rollers maintained at the surface temperature of 170° C., remarkably improved fixing properties were confirmed. The amount of the offset toner was one fifth of that provided by the best model of a conventional device. This made it possible to prolong the intervals of the replacements of the cleaning member up to 5 times. The quality of the image was good without collapse of the image. The rollers were durable to over 200,000 sheets, and even when 300,000 sheets are fixed, the fixing properties were still good and stable.

Figure 6:
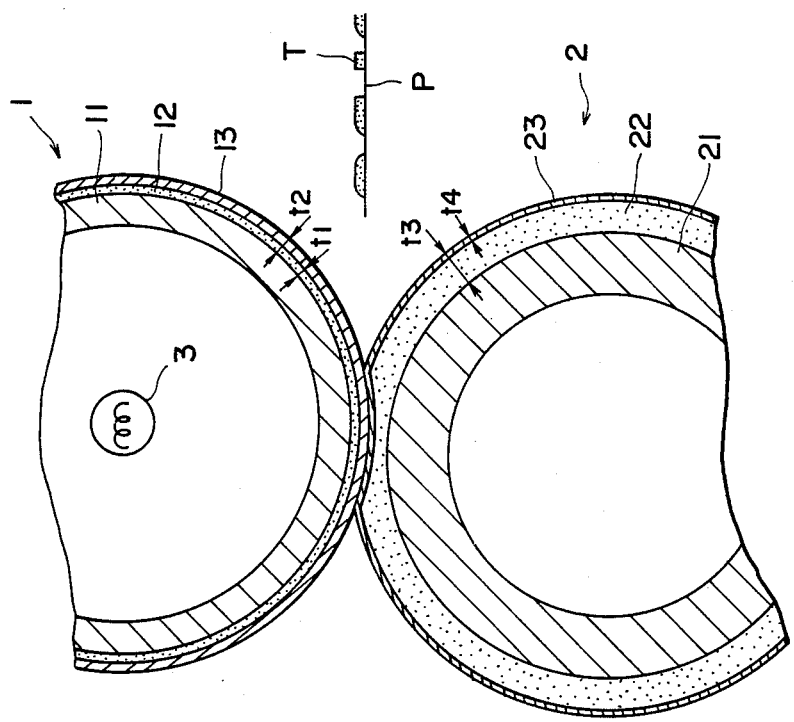
FIG. 6 is an enlarged sectional view of a fixing device which includes an elastic rotatable member according to the present invention.

FIG. 6 is an enlarged cross-sectional view of the fixing device of FIG. 5. Among the thickness $t_1$ of the elastic layer 12 of the fixing roller 1, thickness $t_2$ of the resin layer of the fixing roller, thickness $t_3$ of the elastic layer 22 of the pressing roller and thickness $t_4$ of the resin layer 23 of the pressing roller, there are preferably the following relations:

$t_1 > t_2$ (fixing roller 1)

$t_3 > t_4$ (pressing roller 2)

Further preferably, $t_4 < t_2 < t_1 < t_3$

With those relations satisfied, the fixing roller 1 and the pressing roller 1 cooperate to compensate the drawbacks of each other and enhance the advantages of the other, so that the image quality, the fixing properties and durability are all improved. In this embodiment, the fluorine resin dispersion is, for example, tetrafluoroethylene resin dispersion D-1 available from Daikin Kabushiki Kaisha, Japan.

The present invention is applicable not only to the roller used for fixing an image but also to a belt (rotatable member), such as an intermediate belt usable for transferring and fixing an image simultaneously, a cleaning roller, a parting agent applying roller and others. In those applications, the rotatable member of the present invention has the proper releasability and elasticity so that the image transfer action and the cleaning action are improved (when it is used as a cleaning roller, the cleaning is effected on the basis of the order of surface energy). Further, due to the sufficient elasticity, the parting agent can be applied uniformly, and the image transfer is also uniform. Additionally, the resistance to wear is improved in each of the applications.

FIG. 5 has shown a heating type image fixing device to which the present invention is conveniently applicable. However, the present invention is applicable to a pressure fixing type in which the toner image is fixed by a relatively low pressure, or to a pressure fixing device or a heat fixing device wherein the image is fixed simultaneously wih the image transfer.

In the foregoing embodiments, the devices have been shown as being constituted by two rollers, but the present invention is applicable to each or apart of the rollers of the device including three or more rollers. The present invention is applicable to aparting agent applying roller, cleaning roller or belts of such a structure.

The present invention covers the above described embodiments wherein the thickness of the rubber layer is 0.1-1.0 mm, and the thickness of the resin layer is 1-50 microns. Each of the thickness values is an average, or more preferably, the minimum.

In the embodiments described above, no bonding layer is used between the fluorine resin layer and the silicone rubber layer. However, the present invention covers the case where a bonding layer is used.

According to the embodiments of the present invention used with an image fixing rollers, the resistance to wear and the surface releasability are improved while maintaining the desired surface properties of the fluorine resin layer and the elastic properties of the rubber layer. Also, it can faithfully follow the toner image or the other roller, and the service life thereof is much improved.

Further, the advantages that curling of the recording sheet is prevented and that a sharp fixed image can be formed with good fixing properties, can be maintained for a longer period of time than conventional devices, when the embodiments are applied to one of the rollers (or belt) for pressing the recording material. Additionally, the thermal efficiency in the image fixing operation is good, and therefore, the temperature required for the image fixing can be reduced by, for example, 20° C., whereby the consumption of electric power can be reduced without reducing the image fixing speed.

The roller according to this invention has a fairly smooth surface so that the necessity of abrading the surface can be reduced.

Figure 7:
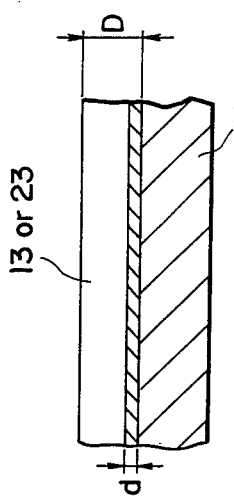
FIG. 7 is an enlarged sectional view of a surface resin layer of an elastic rotatable member according to the present invention.
Figure 8:
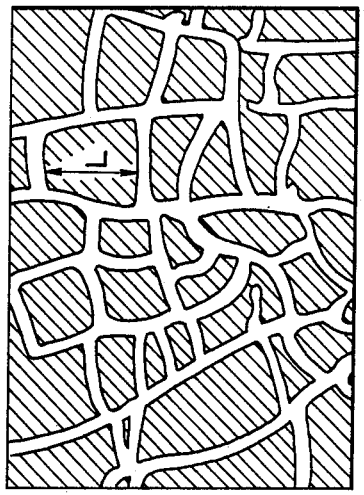
FIG. 8 is an enlarged view of a part of the resin layer.

FIGS. 7 and 8 illustrate another embodiment, wherein the mechanical structures are the same as those described with the embodiment of FIGS. 5 and 6, and therefore, a detailed explanation thereof is omitted for the sake of simplicity.

In this embodiment, the portion of the fluorine resin layer adjacent the rubber layer has very fine discontinuous lands (L) in a form like mud cracking, the remainder of the resin layer being normal integrally sintered layer, and particularly, the surface thereof is smooth enough to show satisfactory releasability. FIG. 8 shows an enlarged view of the cracked part of this resin layer removed from the roller. The hatched portions are resin parts separated by the cracks. In this embodiment, the thickness D of the resin layer is 25 microns, and the thickness d of the cracked part is 8-10 microns.

The rollers 1 and 2 in this embodiment are manufactured by the method described with FIG. 1 in the manners which meet the respective purposes. It is possible to form the cracks in the following manner.

The formation of the cracks is dependent upon the state and speed of drying and the surface conditions of the backing layer, that is, the rubber layer. In this embodiment, the drying operation was performed under the conditions of 40°-80° C. and 40-60% humidity, and the above described cracks were provided. The period of this heating may be 30 seconds-10 minutes. It should be noted that the number of cracks increases with decreasing heating period.

Similarly to the above described embodiments, after sintering and quickly cooling, a sufficiently thick sintered fluorine resin layer is formed, bonding strongly to the rubber layer, wherein the resin layer has a degree of crystallinity of not more than 95%; a tensile strength of not less than 50 kg/cm$^2$; and a contact angle (water) of not less than 100 degrees. The rubber properties of the backing layer of silicone rubber of the fixing roller 1 or the heating roller 2 are substantially the same as before the sintering although the surface resin layer is completely sintered.

The advantages provided by the formation of cracks will be described.

Without the cracks, the resin has a high volume resistivity, which may sometimes be to high that the contamination of the roller surface is increased by the triboelectric charge produced during conveyance. When the cracks are formed, the resin layer has a lower volume resistivity, namely, in the order of $10^7$–$10^8$. Owing to the low resistivity, it may be unnecessary to add particular materials to the resin layer in order to decrease the resistivity to prevent electrification (triboelectric charge) and contamination of the surface layer.

It is important to note that the cracks are formed not adjacent the surface of the resin layer but in the inside part thereof, whereby the smoothness of the resin layer surface is not damaged, thus maintaining releasability of the surface. Further, because of the existence of the cracks, the bonding to the backing rubber layer is made stronger.

The fixing device having the rollers produced in this manner has shown durability to image fixing operations of 300,000 sheets, with one half of the offset occurrences as compared with the conventional device, and further the fixed image has a good image quality.

It is preferable that the thickness D of the non-crack layer and the thickness d of the crack layer satisfy:

$$D - d \geq 5 \text{ (micron)}$$

The dimension of the land L as indicated in FIG. 8 is preferably not less than 0.05 microns but not more than 5 mm.

The cracks can be observed after the roller is manufactured. However, as in the case of heat fixing where the elastic layer is heated, the cracks are not observed by the naked eye because the light scattering decreases due to the thermal expansion or thermal hysteresis of the elastic layer heated during or after use. In such a case, they can be observed by a microscope of 10–100 magnification, so that the existence and effects thereof can be confirmed.

Next, the method of producing the cracks will be described. The formation of the cracks is different depending on the thickness of the resin layer. For example, when the resin layer having a thickness not less than 14–15. microns is to be produced, the drying operation is effected under the conditions of 40°–80° C., 40–60% humidity for 30 seconds–10 minutes. Depending on the degree of drying after the dispersion is applied, the crack can extend up to the surface, which is not desirable. If this occurs, therefore, the surface layer is repaired by heating and pressing the surface thereof. The conditions are more or less different depending on the thickness of the resin layer, which however can be determined suitably by one skilled in the art in consideration of the description of this specification. The cracks may be produced by changing the surface conditions of the backing elastic layer. For example, the cracks can be provided if the surface of the elastic layer before the resin is applied is cleaned by so-called neutral soap and abrading it two or three times with alumina abrasive powder. If it is abraded 5 times or more, the surface of the elastic layer is cleaned too much to form the cracks. If the normal surface abrasion is performed relatively roughly without using the abrasive material, the particles resulting from the abrasion deposited on the surface are effective to produce the cracks. Those methods are suitable when the thickness of the resin film is not more than 15 microns.

The rollers produced in this manner, when used for image fixing, are less chargeable due to the existence of the cracks, and the bonding strength between the rubber layer and the fluorine resin layer is high so that the surface layer is not so rapidly peeled as in conventional devices. Further, the durability is remarkably increased. Additionally, the silicone rubber characteristics are not deteriorated by heat, while the fluorine resin layer is completely sintered, and therefore, it has a sufficient impact resilience with less permanent compression stress. The surface releasability and the durability to wear is increased without damaging the elasticity. Because of the cracks, the roller has a very long service life, and the offset preventing effects can be enjoyed without adding any additives to the resin layer, since the cracks decrease the resistivity.

Another embodiment of the present invention will be described, by which the electrification is reduced, and the bonding strength between the rubber layer and the resin layer is increased. In this embodiment, a sintered resin layer is formed on an elastic layer, wherein the resin layer has fine voids or pores having sizes which do not allow liquid to enter. The maximum porosity or void content is not more than 10%, and the volume resistivity is not more than $10^{11}$ ohm.cm.

Further, the rotatable member of this embodiment can include the feature that a vulcanized silicone rubber is coated with fluorine resin powder, and the resin powder is heated up to a temperature not less than the crystalline melting point to be sintered and unified with the silicone rubber. The sintered fluorine resin layer has a degree of crystallinity of not more than 95%, a tensile strength of 50 kg/cm$^2$ or more, while the silicone rubber after the resin layer is sintered, has a sufficient rubber elasticity of 30–80 degrees in a room temperature rubber JISA hardness.

In this embodiment, the mechanical structures are the same as in FIGS. 5 and 6.

The fluorine resin layer is produced by a method which will be described hereinafter so that fine pores or voids (average diameter is not more than 0.05 micron) are formed in the area of approximately 7% of the entire surface. The surface resistivity is approximately $10^{10}$ ohm.cm. Since the pure fluorine resin has the volume resistivity of $10^{18}$ ohm.cm or more, the resistivity is decreased by the order of $10^8$.

The amount of the voids can be controlled depending on the drying speed of the fluorine resin dispersion. More particularly, the amount increases with increase of the drying speed, and no voids are produced if the drying speed is very low. Therefore, in this embodiment, the resin is heated for 1–2 minutes at 80°–100° C. or higher, and it is dried for 10 minutes–1 hour. Then, voids are produced.

It is preferable that the maximum diameter of the voids is less than 0.1 micron, but it is satisfactory if there is a portion in the path of each of the voids, having a diameter of less than 0.1 micron. The porosity is preferably not more than 10 % maximum. The reason will be described. Under the resin layer, there is an elastic layer such as a rubber layer. If liquid such as an offset preventing agent is applied to and, deposited on the surface layer and enters into the resin layer, the elastic layer can deteriorate, resulting in poor fixing performance. On the contrary, low molecular material contained in the elastic layer is vaporized and tends to separate the resin layer from the elastic layer or to decrease the bonding strength therebetween. Particularly when the resin is locally peeled, the durability is remarkably degraded.

In the case of the fixing device described above, if the voids having the above described preferable sizes are formed, offset preventing liquid such as silicone oil, paper dust or toner particles do not penetrate the resin layer down to the rubber elastic layer. On the other hand, the vapor of the low molecular material emitted from the rubber layer during the formation of the resin layer is released through the voids. Therefore, a possible cause of peeling does not remain in the roller. Thus, the durability and the bonding strength is high. Additionally, as described above, the voids are effective to decrease the resistivity without specific additives, so that the offset prevention effect is increased.

An actual device manufactured in accordance with this embodiment was durable to 300,000 sheets, and the occurrences of offset were decreased to one half of that of conventional devices. The image quality was good enough. The image fixing device in accordance with this embodiment had a charge preventing effect due to the existence of the voids. The resistance to wear, and surface releasability were good enough. The rotatable members had the surface properties of the resin layer and the elastic properties of the elastic layer. If a low molecular material is vaporized from the rubber layer during the image fixing operation, it can be removed to the outside of the rotatable member. Therefore, the service life or durability is increased. The bonding strength between the resin layer and the rubber layer is not influenced.

Another embodiment of the present invention will be described. This embodiment is particularly based on the thickness of the resin layer and the impact resilience of the rubber layer to provide advantages in durability and fixing properties. This embodiment is not directly related with the method of producing the elastic rotatable member described with the foregoing embodiments, although it is preferable.

In this embodiment, a layer of resin powder (unsintered) is applied on the surface of the rubber layer, and the resin layer is heated and sintered, thus providing a roller or rollers for the image fixing function. The thickness of the resin film is not less than 5 microns and not more than 35 microns (preferably the film strength is not less than 50 kg/cm$^2$). The impact resilience of the rubber layer is 42–85% (preferably, the peeling strength between the resin and the rubber is not less than 20 g/10 mm (width)), the film thickness (micron) and the impact resilient (%) satisfy:

Film thickness (T)≦0.75×Impact resilience (E)−26.4.

Figure 9:
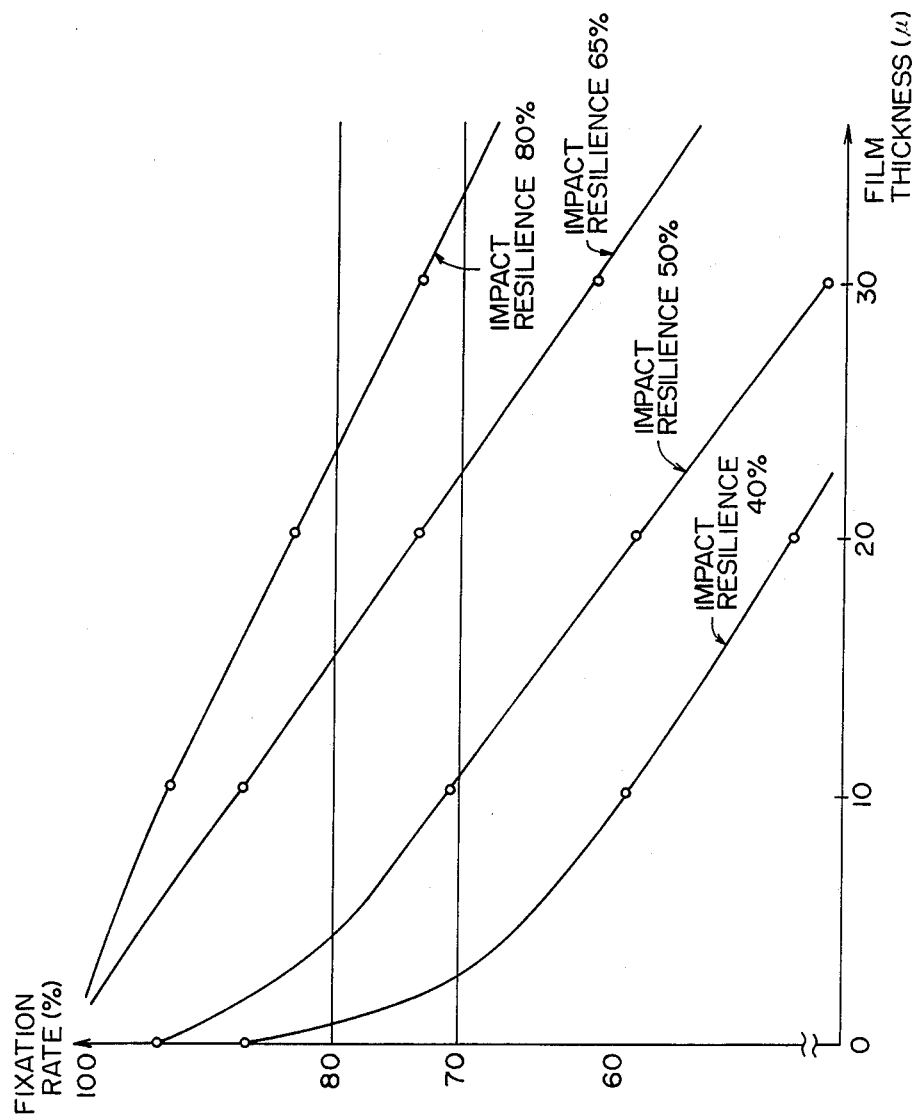
FIG. 9 is a graph showing a relation between a fixation rate and a film thickness of the resin layer with a parameter of an impact resilience in an elastic rotatable member according to another embodiment of the present invention.
Figure 10:
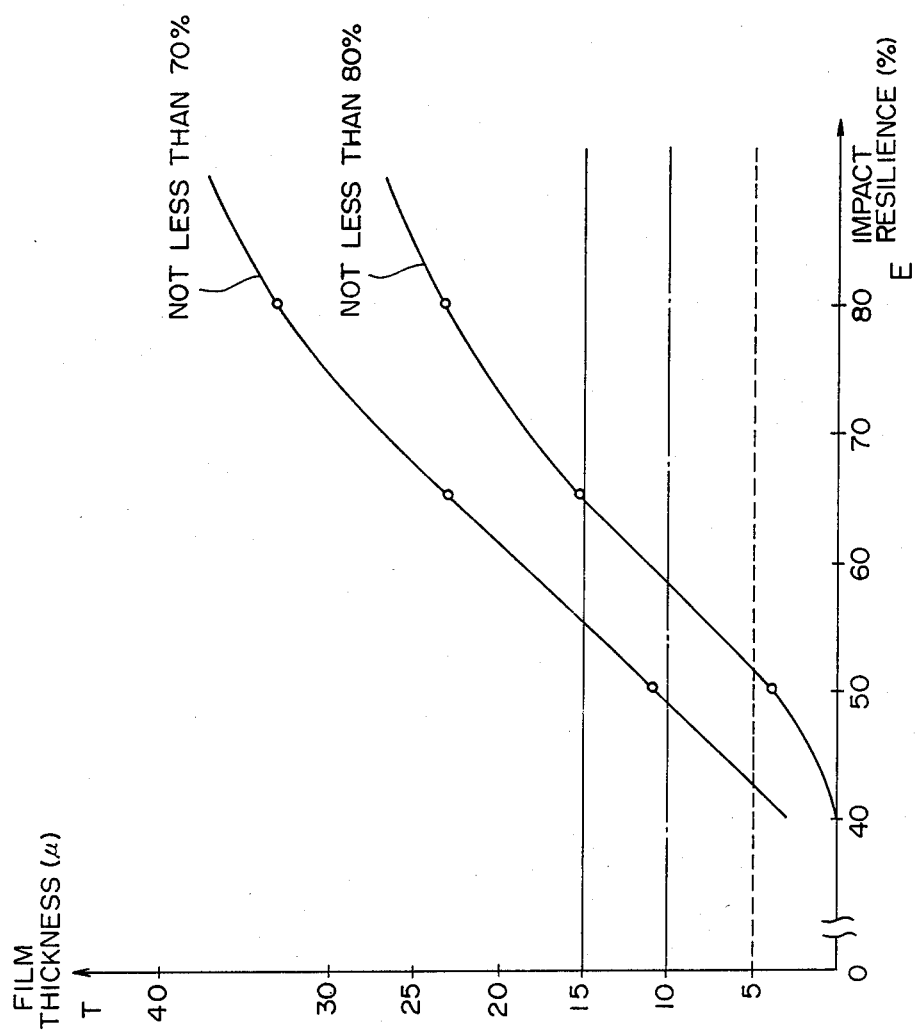
FIG. 10 is a graph showing a relation between a film thickness and an impact resilience in the embodiment of FIG. 9.

FIGS. 9 and 10 illustrate this embodiment. The thickness of the silicone rubber is 0.5 mm, which is coated with PTFE surface layer. The outer diameter of a fixing roller is 40 mm, and the outer diameter of an elastic pressing roller is also 40 mm. The width of the press contact therebetween is 5 mm. The speed of the paper feed is 200 mm/sec., and the surface temperature of the fixing roller is 160° C. Those figures are the ones of an actually manufactured device. As for the sheet on which the toner image is fixed, a sheet of paper having a poor surface property has been used, which has the surface roughness of 13–15 microns. This is done on purpose in order to see how the surface of the fixing roller follows the surface roughness of the sheet.

FIG. 9 shows the relation between the fixation rate and the thickness of the resin layer when the impact resilience of the silicone rubber layer is constant. This graph is based on the experiments carried out with the impact resilience of 40%, 50%, 65%, and 80%, and the thickness of the resin layer of 10 microns, 20 microns and 30 microns. The thermal conductivity of each of the fixing rollers was approximately $0.8 \times 10^{-3}$ cal.cm/sec.cm$^2$° C. As will be seen from this graph, when the impact resilience is 40% or 50%, the fixation rate increases with a decrease in the thickness of the resin layer, but the durability thereof is only 10,000 sheets. When the resin layer thickness is 5–10 microns, the fixation rate becomes less than 70%, which is not practical. With the increase of the impact resilience, the fixation rate is increased. However, when the thickness of the resin layer is small, the resin layer is sometimes peeled off the rubber layer by the friction with the sheet, the separation pawl and/or the temperature detecting sensor. If the impact resilience is sufficient, the durability is not less than 100,000 sheets when the thickness of the resin layer is not less than 5 microns. When it is not less than 10 microns the durability is 200,000 sheets. If, however, the thickness of the resin layer is 35 microns or larger, the fixation rate is not improved even when the impact resilience of the rubber layer is increased. This shows that the thickness of the resin layer is decisive as to whether the fixing roller exhibits the properties of the rubber layer.

FIG. 10 shows the relation between the resin film thickness and the impact resilience when the fixation rate is 70% and 80% in FIG. 9 in order to investigate the relation between the thickness of the resin film layer and the rubber layer.

As will be understood, the increase of the thickness of the resin film results in poor fixation rate. If the film thickness is reduced with an objective of increasing the fixation rate, the durability is decreased. Therefore, a thickness not less than 5 microns is preferable, and practically, not less than 10 microns is preferable. If the thickness is not less than 10 microns, the minimum thickness thereof is not less than 5 microns even if the thickness varies, so that the performance of the roller is guaranteed.

As an example of the film thickness and the impact resilience, when the film thickness is not less than 10 microns, the impact resilience of the rubber layer is not less than 49% in order to obtain a fixation rate not less than 70%; and not less than approx. 58% in order to obtain a fixation rate not less than 80%. When the film thickness is not less than 15 microns, the impact resilience of the rubber layer is preferably not less than 55% in order to obtain a fixation rate not less than 70%; and not less than approx. 65% in order to obtain a fixation rate not less than 80%.

The film thickness is preferably not more than 35 microns in order to obtain a fixation rate not less than 70%; and not more than 25 microns in order to obtain a fixation rate not less than 80%.

If a fixation rate of 80% or more is considered as being standard, the impact resilience is preferably 60–85% (in the case of the silicone rubber 85% is the upper limit), and the film thickness is preferably 10–25 microns; in order to obtain a more stabilized fixation rate and durability, the impact resilience is preferably 65-85%, and the film thickness is preferably 15-25 microns.

Within those ranges, the fixing device is durable and satisfactory in fixing performance.

As additional common requirements to be satisfied in order to obtain a fixation rate not less than 70%, the tensile strength of the resin layer is not less than 50 kg/cm$^2$, and the bonding strength between the rubber layer and the resin layer is not less than 20 g/10 mm (width).

Where the rubber layer is of silicone rubber, the rubber hardness (JISA) is preferably not less than 30 degrees and not more than 80 degrees; the elongation is not less than 150%; and 100% tensile stress is not less than 10 kg/cm$^2$.

On the basis of the foregoing, in order to obtain a fixation rate of not less than 70%, it is preferable that the film thickness T (micron) and the impact resilience E (%) of the rubber layer satisfy:

$42 \leq E \leq 85$, $5 \leq T \leq 35$, and $T \leq (0.75E - 26.4)$.

When these inequalities are satisfied, the fixing device has a durability of not less than 100,000 sheets.

In order to obtain a fixation rate of 80% or more, the film thickness and impact resilience should satisfy:

$58 \leq E \leq 85$, $10 \leq T \leq 25$, and it $T \leq (0.65E - 27.3)$

If these inequalities are satisfied, the durability is not less than 200,000 sheets. It is further preferable, in order to obtain a fixation rate of not less than 80%, that $15 \leq T \leq 25$ be satisfied. If this requirement is satisfied, the durability is 300,000-500,000 sheets.

According to this invention, the resin film thickness can be increased if the impact resilience is increased. Simultaneously, fixing performance and durability are also improved.

The fixation rate is obtained in the following manner.

First, a solid black circular image having the diameter of 24 mm is formed. The image density thereof is $D_0$. The image is rubbed 10 reciprocations under the pressure of 40 g/cm$^2$ 2 by so-called "KOJIN WIPER", unwoven fabric available from Kabushiki Kaisha Kojin Seizo, Japan, "PAPER WES" (Tradename) which is a disposable wiping material having a softness like tissue paper and a rough surface of grain pattern, and having a crepe rate of $32 \pm 3\%$, weight of $35 \pm 3$ g/m$^2$, tensile strength (in the longitudinal direction) of 0.4 kg/10 mm and a thickness of 200 microns. The density of the image after being rubbed is $D_1$. The fixation rate of defined as $(D_1/D_0) \times 100$ (%).

The density is measured by a Macbeth reflection density meter. The reference density $D_0$ is controlled to be not less than 1.0 and not more than 1.1.

Practically, the durability should not be less than 100,000 sheets and the fixation rate should be 70% from the standpoint of reliability and stability of the fixing operation.

According to this embodiment, the advantages of the resin layer in releasability and durability to wear can be provided. Still, the rubber layer backing the resin layer provides the desirable elasticity. The durability and the fixing properties are stabilized.

In this embodiment, when the thickness of the resin layer is not less than 10 microns, the durability is over 150,000 sheets. When the thickness is not less than 15 microns, the durability is not less than 200,000 sheets. The disadvantages that the fixing properties are degraded by increasing the thickness of the resin layer is compensated by the impact resilience of the rubber layer, and therefore, highly desirable fixing properties can be provided. This embodiment is particularly effective when a fluorine resin layer is formed on a silicone rubber layer.

The final embodiment is related to the width of the nip formed between two elastic rotatable members press-contacted to each other, as shown in FIGS. 5 and 6. This embodiment is effective without the feature of the method of manufacturing the elastic rotatable member described hereinbefore.

The problems from which the present invention starts will first be described. When the thickness of the resin film is thin, there is a tendency that the surface is relatively easily damaged by a member or members contacted to the roller, such as separation pawls or the like, durability is degraded, and further satisfactory fixing properties can not be achieved. On the other hand, the image fixing power has sometimes been unsatisfactory even when a sufficient press-contact area is formed with a constant resin film thickness. It has been possible that when the press-contact area is reduced, the resin film is peeled after several ten thousands sheets are fixed.

Conventionally, it has been difficult to solve those problems, and therefore, the fixing power has to be increased by a complicated control of the heating means, or the material of the fixing roller has to be changed widely. In any case, it has been not possible to satisfy both the durability and the fixing properties. In order to achieve the dual purposes which are contradictory, the inventors have noted the thickness of the resin film and the nip area. If this embodiment is used together with the method of producing the elastic rotatable members described hereinbefore, the results are better.

This embodiment is based on the specific relation between the nip area and the thickness of the resin layer of one of the rotatable members. The device according to this embodiment includes a first rotatable member having an elastic layer and a surface resin layer thereon, and a second rotatable member which is cooperative with the first rotatable member to form a nip therebetween. The image is fixed when the sheet is passed through the nip. The thickness T (micron) of the first rotatable member and the width N (mm) of the nip area satisfy:

Upper limit: $T \leq (5/4)N + 20$; and
Lower limit: $T \geq (4/7)(3N - 2)$: when $N \leq 10$: or
$T \geq (\frac{1}{3})N + 11$: when $N \geq 10$.
Particularly, it is better that they satisfy:
When $N \leq 10$, $T \geq (5/3)(N + 2)$, and when $N \leq 10$, $T \geq (\frac{1}{3})N + 15$.

Figure 11:
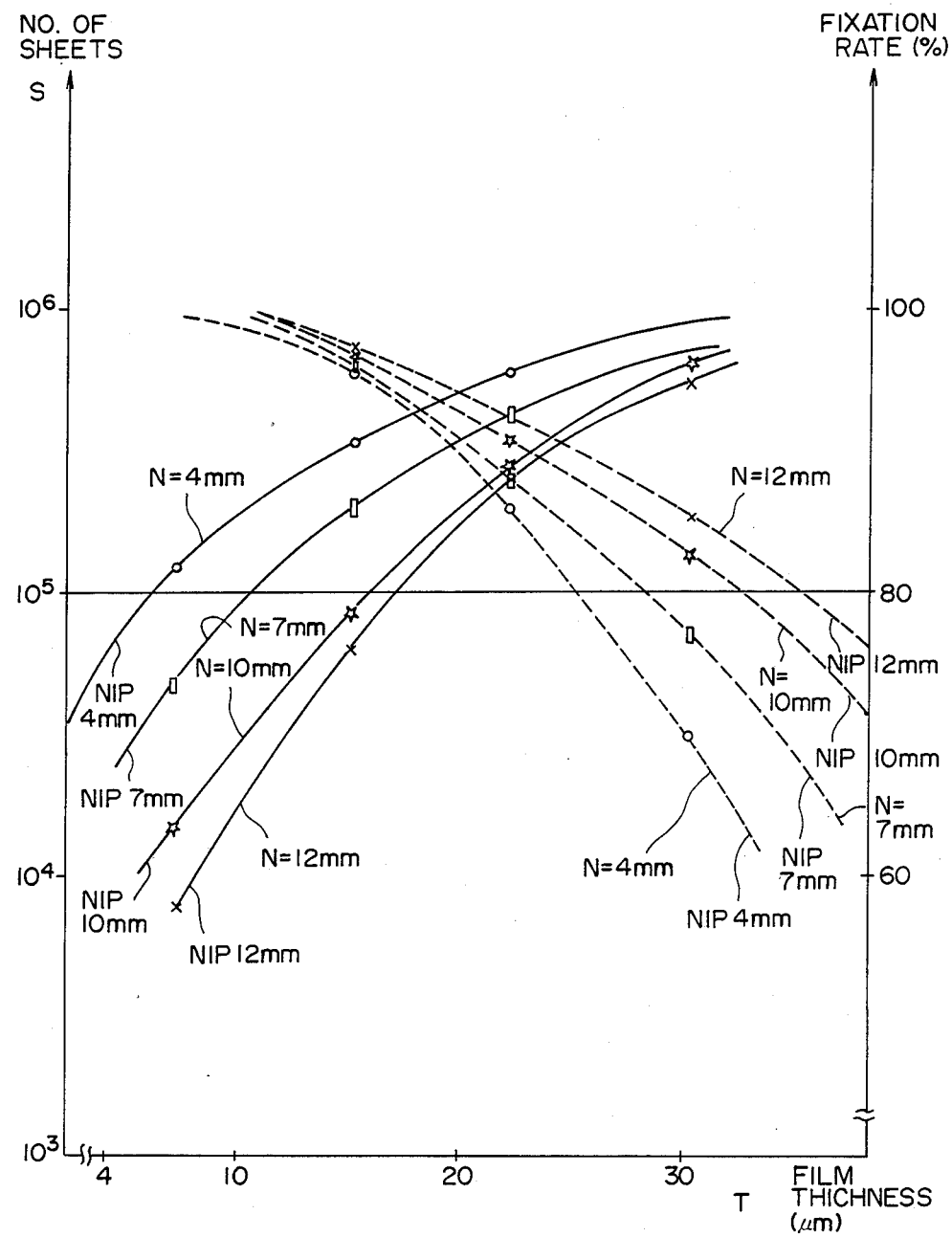
FIG. 11 is a graph showing relations among the durability of a rotatable member, fixation rate and a film thickness of a resin layer with a parameter of nip width in another embodiment of the present invention.
Figure 12:
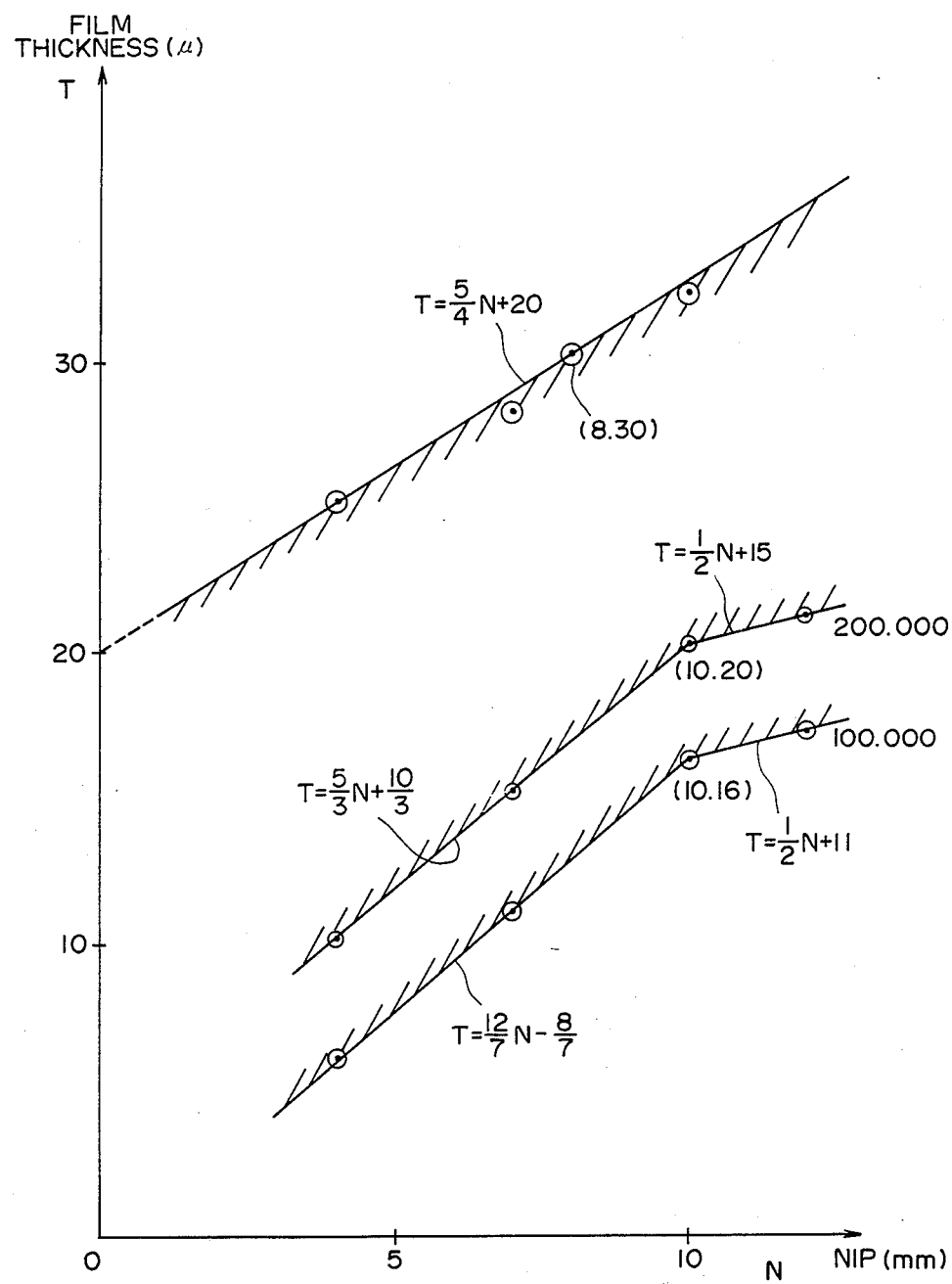
FIG. 12 is a graph showing a relation between the film thickness and the nip width in the embodiment of FIG. 11.

FIGS. 11 and 12 illustrate those values, which are obtained from the rollers explained in conjunction with FIGS. 9 and 10. FIG. 11 shows the relation among the durability of the fixing roller 1, the film thickness of the resin layer, the fixation rate and the width of the nip. In this Figure, the durability (number of sheets) is indicated in semilogarithmic coordinates: the fixation rate is indicated in usual coordinates; the solid lines represent the relation between the film thickness (T) and the durability (S); and the broken lines represent the relation between the film thickness (T) and the fixation rate (%).

Those relations are shown with a parameter of the width (N) of the nip area, 4 mm, 7 mm, 10 mm and the data at the film thicknesses (T) of 7, 15, 22 and 30 microns are plotted. In these experiments, the thermal conductivity of each of the heating rollers was approx. $0.8 \times 10^{3.1 \, 3}$ cal.cm/sec.cm$^2$°C. Therefore, it is not necessary to consider other conditions. The fixing operations were effected at the speed of 200 mm/sec. and at 38 sheets (A4 size)/min. The outside diameter of each of the rollers was approx. 50 mm. The pressing roller was a rubber roller having a JISA rubber hardness of 40 degrees. The total pressure was 50 kg when the nip width is 4 mm, 65 kg when the nip width is 7 mm; and 80 kg when the nip width is 10 mm.

In FIG. 11, permissible conditions for this embodiment are set to be 10,000 sheets for the durability and 80% for the fixation rate, which are shown in FIG. 11.

Generally, when the thickness of the resin layer of the fixing roller increases, it functions as a thermally insulative layer. Thus, it is believed that the fixing properties are degraded since the inside heat is not released. On the other hand, if the thickness is too small, the roller is not able to accumulate sufficient heat, resulting in poor fixing properties. The thickness of the resin layer is preferably increased simply from the standpoint of the durability to wear. However, in such a device as in this embodiment, wherein the resin layer is formed on the elastic layer, there is another problem from a standpoint of durability that the resin layer can be separated from the elastic layer. It has been confirmed through experiments that even if the resin layer is thin, the fixation rate can be poor; and even if the resin layer is thick, the fixation rate can be better. Through various experiments, the inventors have found that the nip area is an important parameter when durability is considered.

FIG. 11 shows that when the thickness of the resin layer is not less than 16 microns, the width of the nip is hardly influential. On the other hand, it is remarkably influential to the durability when the resin film thickness is not more than 26 microns. The nip width N is influential to the increase of durability as the durability decreases. It contributes to the increase of fixing properties as the fixation rate increases. This has been confirmed through the experiments as shown in FIG. 11. Sufficient fixation rate and durability could not be obtained without properly determining the resin film thickness and the nip width, and the heating means and the pressing means or the material of the rollers are limited and complicated necessarily.

Stated another way, the inventors have noted that the problems are solved by determining properly the resin film thickness and the nip width.

Durability of not less than 100,000 sheets and a fixation rate of not less than 80% are simultaneously achieved when the nip width is 4 mm, the film thickness is approx. 6.0 microns to approx. 25.0 microns; when the nip width is 7 mm, the resin film thickness is approximately 10.4 microns to 28.1 microns; and when the nip width is 10 mm, the resin film thickness is approx. 16.0 microns to approx. 32.2 microns.

FIG. 12 illustrates the desirable range of resin film thickness T and nip width N which are approximated by rectilinear lines. The range usable in this embodiment is expressed as follows:

$$(\tfrac{1}{2})N + 11 \leq T \leq (5/4)N + 20 \quad (N \geq 10)$$

$$(12/7)N - (8/7) \leq T \leq (5/4)N + 20 \quad (N \leq 10)$$

More preferably, (not less than 200,000 sheets durability):

$$(\tfrac{1}{2})N + 15 \leq T \leq (5/4)N + 20 \quad (N \geq 10)$$

$$(5/3)N + (10/3) \leq T \leq (5/4)N + 20 \quad (N \leq 10)$$

As for the thickness T of the resin film, the average thickness is preferably not less than 5 microns and not more than 35 microns in consideration of heat capacity and other unstable parameters, and it is preferably not less than 5 microns.

The graph of FIG. 12 has been produced from FIG. 11 data under the conditions that the durability is not less than 100,000 sheets or 200,000 sheets and that the fixation rate is not less than 80%. The lines in FIG. 12 correspond to the upper limit and the lower limit.

As will be understood, the present invention provides a solution to the problem discussed hereinbefore with conventional devices. The relation of this embodiment between the thickness of the resin layer on the elastic member and the width of the nip where the image fixing action takes place is defined as described above, with the result of improved durability and fixing properties.

When the resin layer is less than 35 microns, the effect of the backing layer is small, and therefore specific features are required to increase the fixation rate. Therefore, the thickness thereof is preferably not more than 35 microns to maintain the effects of the rubber layer.

As for the material of the elastic layer, rubber is preferable. When durability to heat is required, silicone rubber having impact resilience of not less than 60% is suitable. The resin layer has preferably a thickness of 10-25 microns. In order to obtain a more stabilized fixation rate, the impact resilience is 65-85%, and the film thickness is 15-25 microns. The material of the resin layer is preferably fluorine resin. More preferably, it has a tensile strength of not more than 50 kg/cm$^2$, and further preferably, not less than 150 kg/cm$^2$. When the resin layer is formed on the rubber layer, the bonding strength is preferably not less than 20 g/10 mm (width), which can be provided through the above-described method.

In FIG. 12 the lines approximating the lower limit of the resin film thickness deflects at the point of 10 mm of the nip width. It is believed that this film thickness (16 microns) is in the middle of the permissible range so that the effects of the nip width and those of the film thickness are combined to recover variations of the elastic layer and the bonding layer on the surface of the inner layer so as to enlarge the permissible range.

Any of the embodiments described in the foregoing can be combined with the other without losing their own advantages. Therefore, the present invention covers such combinations.

While the invention has been described with reference to the structures disclosed herein, it is not confined to the details set forth and this application is intended to cover such modifications or changes as may come within the scope of the following claims.

What is claimed is:

1. An elastic rotatable member for fixing an unfixed image, said member comprising:
    a core member;
    an elastic rubber layer comprising silicone rubber formed outside said core member; and
    a surface layer of fluorine resin material formed outside said elastic layer;
    wherein said surface layer is provided by forming an unsintered resin material layer together with liquid outside said elastic rubber layer and sintering the resin material by heating the resin material up to a temperature which is higher than that of said elastic rubber layer and which is higher than a melting temperature of the resin material.

2. An elastic rotatable member for fixing an unfixed image, said member comprising:
    a hollow metal core member;
    an elastic rubber layer comprising silicone rubber formed outside said core member; and
    a surface layer of fluorine resin material formed outside said elastic rubber layer;
    wherein said surface layer is not less than 10 microns thick and is provided by forming an unsintered resin material layer together with liquid outside said elastic rubber layer and sintering said resin material by heating said resin material up to a temperature which is higher than a crystalline melting temperature of said resin material and then quenching said resin material and said elastic rubber.

3. A member according to claims 1 or 2 wherein said elastic rubber layer and said surface layer are in direct contact.

4. A member according to claim 1 or 2, wherein the fluorine resin is substantially pure.

5. A member according to claim 1, wherein a surface of the resin material is externally heated in addition to the dielectric heating.

6. A member according to claim 1 or 2, wherein the sintered resin has a degree of crystallinity of not more than 95% and a tensile strength of not less than 50 kg/cm², and wherein the silicone rubber layer has a room temperature rubber JISA hardness of 30 degrees–80 degrees, and has a sufficient elasticity.

7. A member according to claim 6, wherein the sintered resin exhibits a contact angle of not less than 100 degrees and an elongation of not less than 50%, and wherein the silicone rubber layer has a rubber impact resilience of 65–85%.

8. A member according to claim 7, wherein the rubber layer has an elongation of not less than 150%.

9. A member according to claim 2, a bond strength between the surface layer and the elastic rubber layer is not less than 20 g/10 mm width as defined on the basis of a force required for peeling off the rubber layer.

10. A member according to claim 6, wherein a bond strength between said surface layer and said elastic rubber layer is not less than 20 g/10 mm² width as defined on the basis of a force required for peeling off the rubber layer.

11. A member according to claim 1 or 2, wherein said surface resin layer has a maximum void content of not more than 10%, said voids having a size not allowing liquid to reach to the elastic layer, and has a volume resistivity of not more than $10^{11}$ ohm.cm.

12. A member according to claim 11, wherein an average diameter of the voids is less than 0.1 micron, and each of the voids has at least one portion which is less than 0.1 micron.

13. A member according to claims 1 or 2, wherein said surface resin layer includes, adjacent said elastic layer, a discontinuous layer with cracks and a smooth surface layer.

14. A member according to claim 13, wherein the thickness of the surface resin layer D and the thickness d of the discontinuous layer satisfy, $D-d \geq 5$ microns.

15. A member according to claim 13, wherein land portions separated by said cracks has a maximum size larger than 0.05 micron and smaller than 5 microns.

16. A member according to claim 14, wherein land portions separated by said cracks has a maximum size larger than 0.05 micron and smaller than 5 microns.

17. An elastic rotatable member for fixing an unfixed image, said member comprising:
    a core member,
    an elastic rubber layer comprising silicone rubber formed outside said core member;
    a fluorine resin surface layer formed outside said elastic rubber layer, wherein said resin surface layer is provided by sintering resin material by heating it up to a temperature above a crystalline melting temperature thereof; and
    wherein said resin surface layer has a thickness not less than 10 microns and not more than 35 microns, said elastic rubber layer has an impact resilience of 42–85%, wherein the thickness of the resin surface layer T in microns and the impact resilience E in percent satisfies $T < 0.75E - 26.4$; and
    wherein said resin surface layer has a film strength not less than 50 Kg/cm².

18. A member according to claim 17, wherein said rubber layer is of silicone rubber and said resin layer is of polytetrafluoroethylene resin or perfluoroalkoxyethylene resin.

19. A member according to claim 17, wherein said rubber layer is in direct contact with the resin layer.

20. A member according to claim 17, wherein a peeling strength between said resin layer and said rubber layer is not less than 20 g/10 mm width.

21. A member according to claim 17, wherein the thickness T is 10–25 microns, and the impact resilience E is 58–85%, wherein they satisfy $T < 0.65E - 27.3$.

22. A member according to claim 21, wherein the thickness T is not less than 15 microns.

23. In an image fixing apparatus which includes a first rotatable member and a second rotatable member press-contacted to each other to form a nip therebetween through which an image supporting member for supporting an unfixed image is passed so that the image is fixed thereon, at least one of said first and second rotatable members comprising:
    a core member;
    an elastic rubber layer comprising silicone rubber formed outside said core member;
    a fluorine resin surface layer formed outside said elastic rubber layer, wherein said resin surface layer is provided by sintering resin material by heating it up to a temperature above a melting temperature thereof;
    wherein a thickness T (micron) of said resin surface layer and a width N (mm) of the nip satisfies, $T \leq (5/4)N + 20$ when $N \leq 10$, $T > (4/7)(3N-2)$ when $N \geq 10$, $T \geq (\frac{1}{3})N+11$.

24. An apparatus according to claim 23, wherein the thickness T is not less than 5 microns and not more than 35 microns.

25. An apparatus according to claim 23, wherein the thickness T and the width N satisfy,
when $N \leq 10$; $T \geq (5/3)(N+2)$
when $N \geq 10$; $T \geq (\frac{1}{3})N+15$.

26. An apparatus according to claim 23, wherein the thickness T of said surface resin layer is 5–35 microns, and wherein said rubber layer has an impact resilience E of 42–85%, and the thickness T and the impact resilience E satisfies $T \leq 0.75E - 26.4$.

27. An apparatus according to claim 23, wherein said rubber layer is of silicone rubber and said resin layer is of silicone rubber and said resin layer is of polytetrafluoroethylene resin or perfluoroalkoxyethylene resin.

28. An apparatus according to claim 23, wherein said rubber layer is in direct contact with said resin layer.

29. An apparatus according to claim 28, wherein a film strength of said resin layer is not less than 50 kg/cm$^2$, and a peeling strength between said resin layer and said rubber layer is not less than 20 g/10 mm width.

30. An elastic rotatable member for fixing an unfixed image, said member comprising:
a core member;
an elastic rubber layer of silicone rubber formed outside said core member;
a surface layer of polytetrafluoroethylene resin or perfluroroalkoxyethylene resin formed outside said elastic rubber layer, said surface layer having a thickness of not less than 10 microns; and
a bonding layer between said elastic rubber layer and said surface layer;
wherein said surface layer is provided by forming unsintered polytetrafluoroethylene resin or perfuroroalkoxyethylene resin layer together with liquid outside said elastic rubber layer and sintering said polytetrafluoroethylene resin or perfluoroalkoxyethylene resin by heating it up to above a crystalline melting temperature thereof.

31. In an image fixing apparatus which includes a first rotatable member and a second rotatable member press-contacted to each other, between which members an image supporting member for supporting an unfixed image is passed so that the image is fixed thereon, at least one of said first and second rotatable members comprising:
a core member;
an elastic rubber layer comprising silicone rubber formed outside said core member; and
a surface layer of fluorine resin material formed outside said elastic layer;
wherein said surface layer is not less than 10 microns thick and is provided by forming unsintered resin material layer together with liquid outside said elastic rubber layer and sintering said resin material by heating said resin material up to a temperature which is higher than that of said elastic rubber layer and which is higher than a crystalline melting temperature of said resin material.

32. In an image fixing apparatus which includes a first rotatable member and a second rotatable member press-contacted to each other, between which members an image supporting member for supporting an unfixed image is passed so that the image is fixed thereon, at least one of said first and second rotatable members comprising:
a core member;
an elastic rubber layer of silicone rubber formed outside said core member;
a surface layer of polytetrafluoroethylene resin or perfluroroalkoxyethylene resin formed outside said elastic rubber layer; and
a bonding layer between said elastic rubber layer and said surface layer;
wherein said surface layer is not less than 10 microns thick and is provided by forming unsintered polytetrafluoroethylene resin or perfluroroalkoxyethylene resin layer together with liquid outside said elastic rubber layer and sintering said polytetrafluoroethylene resin or perfluoroalkoxyethylene resin by heating it up to above a crystalline melting temperature thereof.

33. In an image fixing apparatus which includes a first rotatable member and a second rotatable member press-contacted to each other, between which members an image supporting member for supporting an unfixed image is passed so that the image is fixed thereon, at least one of said first and second rotatable members comprising:
a core member;
an elastic rubber layer comprising silicone rubber formed outside said core member; and
a surface layer of fluorine resin material formed outside said elastic rubber layer;
wherein said surface layer is not less than 10 micron thick and is provided by forming unsintered resin material layer together with liquid outside said elastic rubber layer and sintering said resin material by heating said resin material up to a temperature which is higher than a crystalline melting temperature of said resin material and then quenching said resin material and said elastic rubber.

34. In an image fixing apparatus which includes a first rotatable member and a second rotatable member press-contacted to each other, between which members an image supporting member for supporting an unfixed image is passed to that the image is fixed thereon, at least one of said first and second rotatable members comprising:
a core member;
an elastic rubber layer comprising silicone rubber formed outside said core member;
a fluorine resin surface layer formed outside said elastic rubber layer, wherein said resin surface layer is provided by sintering resin material by heating it up to a temperature above a crystalline melting temperature thereof, and
wherein said resin surface layer has a thickness not less than 10 microns and not more than 35 microns, said elastic rubber layer has an impact resilience of 42–85%, wherein the thickness of the resin surface layer T in microns and the impact resilience E in percent satisfies the condition $T \leq 0.75E - 26.4$.

35. A member according to claim 30, wherein the sintered resin has a degree of crystallinity of not more than 95% and a tensile strength of not less than 50 kg/cm$^2$, and wherein the silicone rubber layer has a room temperature rubber JISA hardness of 30 degrees–80 degrees.

36. A member according to claim 35, wherein the sintered resin exhibits a contact angle of not less than 100 degrees and an elongation of not less than 50%, and wherein the silicone rubber layer has a rubber impact resilience of 65–85%.

37. A member according to claim 36, wherein the rubber layer has a elongation of not less than 150%.

38. A member according to claim 30, wherein said surface resin layer has a maximum void content of not more than 10%, said voids having a size not allowing liquid to reach to the elastic layer, and has a volume resistivity of not more than $10^{11}$ ohm.cm.

39. A member according to claim 38, wherein an average diameter of the voids is less than 0.1 micron, each voids having at least one portion thereof which is less than 0.1 micron.

40. A member according to claim 30, wherein said surface resin layer includes, adjacent said elastic layer, a discontinuous layer with cracks and a smooth surface layer.

41. A member according to claim 40, wherein the thickness of the surface resin layer D and the thickness d of the discontinuous layer satisfy the condition $D-d \geq 5$ microns.

42. A member according to claim 40, wherein land portions separated by said cracks have a maximum size which is larger than 0.05 micron and smaller than 5 microns.

43. A member according to claim 41, wherein land portions separated by said cracks have a maximum size which is larger than 0.05 micron and smaller than 5 microns.

44. An apparatus according to claims 31 or 33, wherein said elastic rubber layer and said surface layer are in direct contact.

45. An apparatus according to claims 31 or 33, wherein said rubber layer is of silicone rubber, and said surface layer is of fluorine resin.

46. An apparatus according to claim 45, wherein the fluorine resin is substantially pure.

47. An apparatus according to claim 31, wherein a surface of the resin material is externally heated in addition to the dielectric heating.

48. An apparatus according to claim 45, wherein the sintered resin has a degree of crystallinity of not more than 95% and a tensile strength of not less than 50 kg/cm$^2$, and wherein the silicone rubber layer has a room temperature rubber JISA hardness of 30 degrees–80 degrees.

49. An apparatus according to claim 48, wherein the sintered resin exhibits a contact angle of not less than 100 degrees and an elongation of not less than 50%, and wherein the silicone rubber layer has a rubber impact resilience of 65–85%.

50. An apparatus according to claim 49, wherein the rubber layer has an elongation of not less than 150%.

51. An apparatus according to claim 44, wherein a bond strength between the surface layer and the elastic rubber layer is not less than 20 g/10 mm width as defined by a force required for peeling off the rubber layer.

52. An apparatus according to claim 45, wherein a bond strength between said surface layer and said elastic rubber layer is not less than 20 g/10 mm width as defined by a force required for peeling off the rubber layer.

53. An apparatus according to claim 31 or 33, wherein said surface resin layer has a maximum void content of not more than 10%, said voids having a size not allowing liquid to reach to the elastic layer, and has a volume resistivity of not more than $10^{11}$ ohm.cm.

54. An apparatus according to claim 53, wherein an average diameter of the voids is less than 0.1 micron, each of the voids having at least one portion which is less than 0.1 micron.

55. An apparatus according to claims 31 or 33, wherein said surface resin layer includes, adjacent said elastic layer, a discontinuous layer with cracks and a smooth surface layer.

56. An apparatus according to claim 55, wherein the thickness of the surface resin layer D and the thickness d of the discontinuous layer satisfies the condition $D-d \geq 5$ microns.

57. An apparatus according to claim 55, wherein land portions separated by said cracks have a maximum size which is larger than 0.05 micron and smaller than 5 microns.

58. An apparatus according to claim 57, wherein land portions separated by said cracks have a maximum size which is larger than 0.05 micron and smaller than 5 microns.

59. An apparatus according to claim 32, wherein the sintered resin has a degree of crystallinity of not more than 95% and a tensile strength of not less than 50 kg/cm$^2$, and wherein the silicone rubber layer has a room temperature rubber JISA hardness of 30 degrees–80 degrees.

60. An apparatus according to claim 50, wherein the sintered resin exhibits a contact angle of not less than 100 degrees and an elongation of not less than 50%, and wherein the silicone rubber layer has a rubber impact resilience of 65–85%.

61. An apparatus according to claim 60, wherein the rubber layer has an elongation of not less than 150%.

62. An apparatus according to claim 32, wherein said surface resin layer has a maximum void content of not more than 10%, said voids having a size not allowing liquid to reach to the elastic layer, and has a volume resistivity of not more than $10^{11}$ ohm.cm.

63. An apparatus according to claim 62, wherein an average diameter of the voids is less than 0.01 micron, each of the voids having at least one portion which is less than 0.1 micron.

64. An apparatus according to claim 32, wherein said surface resin layer includes, adjacent said elastic layer, a discontinuous layer with cracks and a smooth surface layer.

65. An apparatus according to claim 64, wherein the thickness of the surface resin layer D and the thickness d of the discontinuous layer satisfies $D-d \geq 5$ microns.

66. An apparatus according to claim 64, wherein land portions separated by said cracks have a maximum size which is larger than 0.05 micron and smaller than 5 microns.

67. An apparatus according to claim 65, wherein land portions separated by said cracks have a maximum size which is larger than 0.05 micron and smaller than 5 microns.

68. An member according to claim 17, wherein the sintered resin has a degree of crystallinity of not more than 95% and a tensile strength of not less than 50 kg/cm$^2$, and wherein the silicone rubber layer has a room temperature rubber JISA hardness of 30 degrees–80 degrees.

69. An member according to claim 17, wherein said surface resin layer has a maximum void content of not more than 10%, said voids having a size not allowing liquid to reach to the elastic layer, and has a volume resistivity of not more than $10^{11}$ ohm.cm.

70. An member according to claim 69, wherein an average diameter of the voids is less than 0.01 micron, each of the voids having at least one portion which is less than 0.1 micron.

71. An member according to claim 17, wherein said surface resin layer includes, adjacent said elastic layer, a discontinuous layer with cracks and a smooth surface layer.

72. An member as according to claim 71, wherein the thickness of the surface resin layer D and the thickness d of the discontinuous layer satisfies D-d≧5 microns.

73. A member according to claims 7 or 72, wherein land portions separated by said cracks have a maximum size which is larger than 0.05 micron and smaller than 5 microns.

74. A member according to claim 17, wherein the heating is effected by dielectric heating.

75. A member according to claim 17, wherein said resin surface layer and said electric rubber layer are quenched after sintering to form said resin surface layer outside said elastic rubber layer.

76. An apparatus according to claim 34, wherein said rubber layer is of silicone rubber and said resin layer is of polytetrafluoroethylene resin or perfluoroalkoxyethylene resin.

77. An apparatus according to claim 34, wherein said rubber layer is in direct contact with the resin layer.

78. An apparatus according to claim 34, wherein a film strength of said resin layer is not less than 50 kg/cm$^2$, and a peeling strength between said resin layer and said rubber layer is not less than 20 g/10 mm width.

79. A apparatus according to claim 34, wherein the thickness T is 10-25 microns, and the impact resilience E is 58-85%, wherein they satisfy T≦0.65E-27.3.

80. A apparatus according to claim 79, wherein the thickness T is not least than 15 microns.

81. An apparatus according to claim 34, wherein the sintered resin has a degree of crystallinity of not more than 95% and a tensile strength of not less than 50 kg/cm$^2$, and wherein the silicone rubber layer has a room temperature rubber JISA hardness of 30 degrees-80 degrees.

82. An apparatus according to claim 34, wherein said surface resin layer has a maximum void content of not more than 10%, said voids having a size not allowing liquid to reach to the elastic layer, and has a volume resistivity of not more than $10^{11}$ ohn.cm.

83. An apparatus according to claim 82, wherein an average diameter of the voids is less than 0.01 micron, each of the voids having at least one portion which is less than 0.1 micron.

84. An apparatus according to claim 34, wherein said surface resin layer includes, adjacent said elastic layer, a discontinuous layer with cracks and a smooth surface layer.

85. An apparatus according to claim 84, wherein the thickness of the surface resin layer D and the thickness d of the discontinuous layer satisfies the condition D−d≧5 microns.

86. An apparatus according to claim 84 or 85, wherein land portions separated by said cracks have a maximum size which is larger than 0.05 micron and smaller than 5 microns.

87. An apparatus according to claim 34, wherein the heating is effected by dielectric heating.

88. An apparatus according to claim 34, wherein said resin surface layer and said elastic rubber layer are quenched after sintering to form said resin surface layer outside said elastic rubber layer.

89. An apparatus according to claim 23, wherein the thickness T is 10-25 microns, and the impact resilience E is 58-85%, wherein they satisfy the condition T≦0.65E-27.3.

90. An apparatus according to claim 89, wherein the thickness T is not less than 15 microns.

91. An apparatus according to claim 23, wherein the sintered resin has a degree of crystallinity of not more than 95% and a tensile strength of not less than 50 kg/cm$^2$, and wherein the silicone rubber layer has a room temperature rubber JISA hardness of 30 degrees-80 degrees.

92. An apparatus according to claim 23, wherein said surface resin layer has a maximum void content of not more than 10%, said voids having a size not allowing liquid to reach to the elastic layer, and has a volume resistivity of not more than $10^{11}$ ohm.cm.

93. An apparatus according to claim 92, wherein an average diameter of the voids is less than 0.1 micron, each of the voids having at least one portion which is less than 0.1 micron.

94. An apparatus according to claim 23, wherein said surface resin layer includes, adjacent said elastic layer, a discontinuous layer with cracks and a smooth surface layer.

95. An apparatus according to claim 94, wherein the thickness of the surface resin layer D and the thickness d of the discontinuous layer satisfies the condition D−d≧5 microns.

96. An apparatus according to claim 94 or 95, wherein land portions separated by said cracks have a maximum size which is larger than 0.05 micron and smaller than 5 microns.

97. An apparatus according to claim 23, wherein the heating is effected by dielectric heating.

98. An apparatus according to claim 23, wherein said resin surface layer and said elastic rubber layer are quenched after sintering to form said resin surface layer outside said elastic rubber layer.

99. A member according to claims 1, 17, 23 or 2, said member further comprising a bonding layer between said elastic rubber layer and said surface layer.

100. A member according to claim 1 or 2, wherein said fluorine resin is polytetrafluoroethylene resin or perfluoroalkoxyethylene resin.

101. An apparatus according to claims 23, 31, 33 or 34, said rotatable member further comprising a bonding layer between said elastic rubber layer and said surface layer.

102. An apparatus according to claim 45, wherein said fluorine resin is polytetrafluoroethylene resin or perfluoroalkoxyethylene resin.

103. An apparatus according to claims 23, 31, 32, 33 or 34, wherein said first rotatable member 12 is contactable to the unfixed image and comprises said core member, said rubber layer and said resin layer.

104. An apparatus according to claim 103, wherein said first rotatable member contains a heater therein.

105. An apparatus according to claims 23, 31, 32, 33 or 34, wherein said second rotatable member is not directly contactable to the unfixed image and includes said core member, said rubber layer and said resin layer.

106. An apparatus according to claims 23, 31, 32, 33 or 34, wherein said first and second rotatable member includes said core member, said rubber layer and said resin layer.

107. An elastic rotatable member for fixing an unfixed image, said member comprising:

a core member;

an elastic rubber layer comprising a silicone rubber formed outside said core member; and a fluorine resin layer formed outside said elastic rubber layer, wherein said resin layer is provided by sintering resin material by heating, wherein said resin layer is porous and has a porosity of not more than 10% and an average pore diameter of not more than 0.1 micron, wherein said resin layer is heated to a temperature above a crystalline melting temperature thereof upon sintering.

108. A member according to claim 107, wherein a porosity of said resin layer provides a volume resistivity of not more than $10^{11}$ ohm.cm.

109. An image fixing apparatus, comprising:

a first rotatable member including a core member, an elastic rubber layer comprising silicone rubber formed outside said core member and a fluorine resin layer on said elastic rubber layer, wherein said resin layer is provided by sintering resin material by heating, said first rotatable member being lubricated by a lubricant, wherein said resin layer has pores which are effective to allow volatile matter from the elastic rubber to pass upon sintering and to prevent the lubricant from passing; and a second rotatable member associated with said first rotatable member; wherein said resin layer is heated to a temperature above a crystalline melting temperature thereof upon sintering.

110. An apparatus according to claim 109, wherein said resin layer has a porosity of not more than 10%.

111. An apparatus according to claim 109, wherein a porosity of said resin layer provides a volume resistivity of not more than $10^{11}$ ohm.cm.

112. An apparatus according to claim 109, wherein an average diameter of the pores is not more than 0.1 microns.

113. An apparatus according to claim 109, wherein the rotatable member having the pores is adapted to contact the unfixed image.

114. An apparatus according to claim 107, wherein said resin layer is not less than 10 microns thick.

115. An apparatus according to claim 109, wherein said resin layer is not less than 10 microns thick.

116. An elastic member according to claim 1, wherein a dielectric loss tangent of said unsintered resin material together with said liquid is larger than that of the elastic rubber, and said sintering is performed by dielectric heating.

117. An image fixing apparatus according to claim 31, wherein said sintering of said resin material is performed by dielectric heating.

* * * * *

UNITED STATES PATENT AND TRADEMARK OFFICE
CERTIFICATE OF CORRECTION

PATENT NO. : 4,842,944

DATED : June 27, 1989

INVENTOR(S) : TSUKASA KUGE, ET AL.

Page 1 of 6

It is certified that error appears in the above-identified patent and that said Letters Patent is hereby corrected as shown below:

ON TITLE PAGE:

IN [73] ASSIGNEE

"Assignee: Canon Kabushiki Kaisha, Tokyo, Japan" should read --Assignees: Canon Kabushiki Kaisha, Tokyo, and Kabushiki Kaisha I.S.T., Ohtsu, both of Japan--.

SHEET 9 OF 10

FIG. 11, "THICHNESS" should read --THICKNESS--.

COLUMN 2

Line 47, "ss" should read --is--.

COLUMN 6

Line 49, "he" should read --the--.

COLUMN 7

Line 10, "resia" should read --resin--.
Line 64, "duplex handing position 18" should read --duplex handling position 18--.

COLUMN 8

Line 42, "reciculation" should read --recirculation--.
Line 61, "original glass" should read --original glass 9--.

UNITED STATES PATENT AND TRADEMARK OFFICE
CERTIFICATE OF CORRECTION

PATENT NO. : 4,842,944
DATED : June 27, 1989
INVENTOR(S) : TSUKASA KUGE, ET AL.

It is certified that error appears in the above-identified patent and that said Letters Patent is hereby corrected as shown below:

COLUMN 9

Line 44, "roller 35" should read --roller and belt 35--.
    Line 50, "registration roller 29" should read --registration rollers 29--.

COLUMN 10

Line 7, "cbmprises" should read --comprises--.
    Line 10, "plate 93" should read --plate 96--.

COLUMN 11

Line 3, "resinis" should read --resin is--.
    Line 9, "Japanase" should read --Japanese--.
    Line 19, "an" should read --a--.

COLUMN 14

Line 35, "fluoride resin layer," should read --fluorine resin layer-- and "layer" (second occurrence) should read --layers--.
    Line 47, "crowned" should read --crowned roller--.

COLUMN 15

Line 36, "roller 1" should read --roller 2--.
    Line 67, "apart" should read --a part--.

COLUMN 16

Line 1, "aparting" should read --a parting--.

UNITED STATES PATENT AND TRADEMARK OFFICE
CERTIFICATE OF CORRECTION

PATENT NO. : 4,842,944
DATED : June 27, 1989
INVENTOR(S) : TSUKASA KUGE, ET AL.

It is certified that error appears in the above-identified patent and that said Letters Patent is hereby corrected as shown below:

COLUMN 17

Line 9, "to high" should read --so high--.

COLUMN 19

Line 54, "resilient (%)" should read --resilience (%)--.

COLUMN 20

Line 4, "fixiation" should read --fixation--.

COLUMN 21

Line 37, "it" should be deleted.
Line 52, "2" should be deleted.
Line 60, "of defined" should read --is defined--.

COLUMN 22

Line 62, "$N \leq 10$," (second occurrence) should read --$N \geq 10$,--.

COLUMN 23

Line 12, "$0.8 \times 10^{3.1\ 3}$" should read --$0.8 \times 10^{-3}$--.
Line 22, "10,000 sheets" should read --100,000 sheets--.

UNITED STATES PATENT AND TRADEMARK OFFICE
CERTIFICATE OF CORRECTION

PATENT NO. : 4,842,944

DATED : June 27, 1989

INVENTOR(S) : TSUKASA KUGE, ET AL.

It is certified that error appears in the above-identified patent and that said Letters Patent is hereby corrected as shown below:

COLUMN 25

Line 31, "claims 1 or 2" should read --claim 1 or 2--.
Line 52, "claim 2, a" should read --claim 2, wherein a--.

COLUMN 26

Line 31, "T<0.75E-26.4;" should read --T$\leq$0.75E-26.4;--.
Line 45, "T<0.65E-27.3." should read --T$\leq$0.65E-27.3.--.

COLUMN 27

Line 30, "perfluroroalkoxyethylene resin" should read --perfluoroalkoxyethylene resin--.
Line 37, "furoroalkoxyethylene resin" should read --fluoroalkoxyethylene resin--.

COLUMN 28

Line 5, "perfluroroalkoxyethylene resin" should read --perfluoroalkoxyethylene resin--.
Line 11, "perfluroroalkoxyethy-" should read --perfluoroalkoxyethy- --.
Line 29, "10 micron" should read --10 microns--.

UNITED STATES PATENT AND TRADEMARK OFFICE
CERTIFICATE OF CORRECTION

PATENT NO. : 4,842,944

DATED : June 27, 1989

INVENTOR(S) : TSUKASA KUGE, ET AL.

It is certified that error appears in the above-identified patent and that said Letters Patent is hereby corrected as shown below:

COLUMN 29

Line 2, "a" should read --an--.
    Line 10, "voids" should read --void--.
    Line 28, "claims" should read --claim--.
    Line 31, "claims" should read --claim--.

COLUMN 30

Line 3, "claims" should read --claim--.
    Line 25, "claim 50," should read --claim 59,--.
    Line 38, "0.01 micron," should read --0.1 micron,--.
    Line 56, "An" should read --A--.
    Line 62, "An" should read --A--.
    Line 67, "An" should read --A--.
    Line 68, "0.01 micron," should read --0.1 micron,--.

COLUMN 31

Line 3, "An" should read --A--.
    Line 7, "An member as" should read --A member--.
    Line 10, "claims 7 or 72," should read --claim 71 or 72--.
    Line 30, "A" should read --An--.
    Line 33, "A" should read --An--.
    Line 34, "least" should read --less--.
    Line 47, "0.01 micron," should read --0.1 micron,--.

UNITED STATES PATENT AND TRADEMARK OFFICE
CERTIFICATE OF CORRECTION

PATENT NO. : 4,842,944

DATED : June 27, 1989

INVENTOR(S) : TSUKASA KUGE, ET AL.

Page 6 of 6

It is certified that error appears in the above-identified patent and that said Letters Patent is hereby corrected as shown below:

COLUMN 32

```
Line 40, "claims" should read --claim--.
Line 46, "claims" should read --claim--.
Line 53, "claims" should read --claim--.
Line 54, "12" should be deleted.
Line 59, "claims" should read --claim--.
Line 63, "claims" should read --claim--.
Lines 64-65, "member includes" should read
            --member each include--.
```

Signed and Sealed this

Twelfth Day of May, 1992

Attest:

DOUGLAS B. COMER

*Attesting Officer*  *Acting Commissioner of Patents and Trademarks*